(12) United States Patent
Baur et al.

(10) Patent No.: US 8,917,437 B2
(45) Date of Patent: Dec. 23, 2014

(54) MIRROR ASSEMBLY WITH FORMED REFLECTIVE ELEMENT SUBSTRATE

(71) Applicant: Magna Mirrors of America, Inc., Holland, MI (US)

(72) Inventors: Michael J. Baur, Holland, MI (US); Gregory A. Huizen, Hudsonville, MI (US)

(73) Assignee: Magna Mirrors of America, Inc., Holland, MI (US)

(*) Notice: Subject to any disclaimer, the term of this patent is extended or adjusted under 35 U.S.C. 154(b) by 0 days.

(21) Appl. No.: 13/942,751

(22) Filed: Jul. 16, 2013

(65) Prior Publication Data

US 2014/0022620 A1 Jan. 23, 2014

Related U.S. Application Data

(60) Provisional application No. 61/755,188, filed on Jan. 22, 2013, provisional application No. 61/673,011, filed on Jul. 18, 2012.

(51) Int. Cl.
*G02F 1/153* (2006.01)
*G02B 7/182* (2006.01)

(52) U.S. Cl.
USPC ............................ 359/267; 359/871; 359/872

(58) Field of Classification Search
USPC ................... 359/265–274, 601–604, 872, 871
See application file for complete search history.

(56) References Cited

U.S. PATENT DOCUMENTS

| | | | |
|---|---|---|---|
| 4,436,372 | A | 3/1984 | Schmidt et al. |
| 4,449,786 | A | 5/1984 | McCord |
| 4,811,029 | A | 3/1989 | Nomoto et al. |
| 4,945,454 | A | 7/1990 | Bunse et al. |
| 5,033,835 | A | 7/1991 | Platzer, Jr. et al. |
| 5,050,977 | A | 9/1991 | Platzer, Jr. et al. |
| 5,080,492 | A | 1/1992 | Platzer, Jr. et al. |

(Continued)

FOREIGN PATENT DOCUMENTS

| WO | WO2008/0094886 | 8/2008 |
|---|---|---|
| WO | WO2010/0144816 | 12/2010 |

(Continued)

OTHER PUBLICATIONS

Hicks, R. Andrew, *Controlling a Ray Bundle with a Free-Form Reflector*, Optics Letters, vol. 33, No. 15, Aug. 1, 2008.

(Continued)

*Primary Examiner* — Mohammed Hasan
(74) *Attorney, Agent, or Firm* — Gardner, Linn, Burkhart & Flory, LLP

(57) ABSTRACT

An exterior rearview mirror assembly for a vehicle includes a mirror head portion and a reflective element accommodated by the mirror head portion. The reflective element includes a glass substrate and a mirror reflector coated at a surface of the glass substrate. The reflective element is configured to provide a field of view of at least about 15 degrees at the side of the vehicle and provides a substantially undistorted reflected image as viewed by the driver of the vehicle. The reflective element may have a width dimension of less than about 15 cm and a height dimension of less than about 9 cm. The mirror substrate is curved or formed via a hydro-bending process utilizing at least one bending element, which may be CNC formed in accordance with a free form pattern of curvatures.

20 Claims, 21 Drawing Sheets

(56) References Cited

U.S. PATENT DOCUMENTS

| | | |
|---|---|---|
| 5,371,659 A | 12/1994 | Pastrick et al. |
| 5,446,576 A | 8/1995 | Lynam et al. |
| 5,459,475 A | 10/1995 | Shen et al. |
| 5,497,306 A | 3/1996 | Pastrick |
| 5,535,056 A | 7/1996 | Caskey et al. |
| 5,550,677 A | 8/1996 | Schofield et al. |
| 5,594,593 A | 1/1997 | Milner |
| 5,610,756 A | 3/1997 | Lynam et al. |
| 5,617,245 A | 4/1997 | Milner |
| 5,669,699 A | 9/1997 | Pastrick et al. |
| 5,670,935 A | 9/1997 | Schofield et al. |
| 5,715,093 A | 2/1998 | Schierbeek et al. |
| 5,751,489 A | 5/1998 | Caskey et al. |
| 5,760,962 A | 6/1998 | Schofield et al. |
| 5,786,772 A | 7/1998 | Schofield et al. |
| 5,793,542 A | 8/1998 | Kondo et al. |
| 5,796,094 A | 8/1998 | Schofield et al. |
| 5,808,777 A | 9/1998 | Lynam et al. |
| 5,816,693 A | 10/1998 | Winston et al. |
| 5,823,654 A | 10/1998 | Pastrick et al. |
| 5,914,815 A | 6/1999 | Bos |
| 5,929,786 A | 7/1999 | Schofield et al. |
| 5,959,792 A | 9/1999 | Ibrahim |
| 6,065,840 A | 5/2000 | Caskey et al. |
| 6,069,755 A | 5/2000 | Li |
| 6,176,602 B1 | 1/2001 | Pastrick et al. |
| 6,198,409 B1 | 3/2001 | Schofield et al. |
| 6,201,642 B1 | 3/2001 | Bos |
| 6,227,689 B1 | 5/2001 | Miller |
| 6,250,148 B1 | 6/2001 | Lynam |
| 6,276,821 B1 | 8/2001 | Pastrick et al. |
| 6,313,454 B1 | 11/2001 | Bos et al. |
| 6,315,419 B1 | 11/2001 | Platzer, Jr. et al. |
| 6,341,523 B2 | 1/2002 | Lynam |
| 6,353,392 B1 | 3/2002 | Schofield et al. |
| 6,396,397 B1 | 5/2002 | Bos et al. |
| 6,412,961 B1 | 7/2002 | Hicks |
| 6,498,620 B2 | 12/2002 | Schofield et al. |
| 6,522,451 B1 | 2/2003 | Lynam |
| 6,582,109 B2 | 6/2003 | Miller |
| 6,690,268 B2 | 2/2004 | Schofield et al. |
| 6,717,610 B1 | 4/2004 | Bos et al. |
| 6,717,712 B2 | 4/2004 | Lynam et al. |
| 6,757,109 B2 | 6/2004 | Bos |
| 6,882,287 B2 | 4/2005 | Schofield |
| 7,005,974 B2 | 2/2006 | McMahon et al. |
| 7,038,577 B2 | 5/2006 | Pawlicki et al. |
| 7,094,312 B2 | 8/2006 | Libby et al. |
| 7,126,456 B2 | 10/2006 | Boddy et al. |
| 7,184,190 B2 | 2/2007 | McCabe et al. |
| 7,195,381 B2 | 3/2007 | Lynam et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,370,983 B2 | 5/2008 | De Wind et al. |
| 7,400,435 B2 | 7/2008 | Byers et al. |
| 7,492,281 B2 | 2/2009 | Lynam et al. |
| 7,526,103 B2 | 4/2009 | Schofield et al. |
| 7,581,859 B2 | 9/2009 | Lynam |
| 7,589,883 B2 * | 9/2009 | Varaprasad et al. .......... 359/267 |
| 7,626,749 B2 | 12/2009 | Baur et al. |
| 7,720,580 B2 | 5/2010 | Higgins-Luthman |
| 7,748,856 B2 | 7/2010 | Zhao |
| 7,777,611 B2 | 8/2010 | Desai |
| 7,824,045 B2 | 11/2010 | Zhao |
| 7,855,755 B2 | 12/2010 | Weller et al. |
| 7,887,204 B2 | 2/2011 | Zhao |
| 7,934,844 B1 | 5/2011 | Zhao |
| 7,944,371 B2 | 5/2011 | Foote et al. |
| 7,965,336 B2 | 6/2011 | Bingle et al. |
| 8,021,005 B2 | 9/2011 | Zhao |
| 8,058,977 B2 | 11/2011 | Lynam |
| 8,091,280 B2 | 1/2012 | Hanzel et al. |
| 8,154,418 B2 | 4/2012 | Peterson et al. |
| 8,169,684 B2 * | 5/2012 | Bugno et al. .................. 359/267 |
| 8,180,606 B2 | 5/2012 | Hicks |
| 8,331,038 B1 | 12/2012 | Snow et al. |
| 8,508,831 B2 | 8/2013 | De Wind et al. |
| 2008/0001733 A1 | 1/2008 | Pinder |
| 2009/0040306 A1 | 2/2009 | Foote et al. |
| 2010/0033854 A1 | 2/2010 | Hicks |
| 2010/0325602 A1 | 12/2010 | Kraft et al. |
| 2011/0043633 A1 | 2/2011 | Sarioglu et al. |
| 2011/0194203 A1 | 8/2011 | Foote et al. |
| 2011/0255141 A1* | 10/2011 | Agrawal et al. ................ 359/267 |
| 2012/0062743 A1 | 3/2012 | Lynam |
| 2012/0092783 A1* | 4/2012 | Lynam .......................... 359/864 |
| 2012/0092784 A1 | 4/2012 | Hicks |
| 2012/0154591 A1 | 6/2012 | Baur et al. |
| 2012/0236388 A1 | 9/2012 | De Wind et al. |
| 2014/0022390 A1 | 1/2014 | Blank et al. |

FOREIGN PATENT DOCUMENTS

| | | |
|---|---|---|
| WO | WO2011/0133400 | 10/2011 |
| WO | WO2013/0071070 | 5/2013 |
| WO | WO2013/0126719 | 8/2013 |

OTHER PUBLICATIONS

Hicks and Perline, *Blind-spot Problem for Motor Vehicles*, Applied Optics, vol. 44, No. 19, Jul. 1, 2005.

* cited by examiner

Flat Mirror – Image Plane

Dimensions:
- 182.3mm wide × 111mm tall

Vertices:

PNT1
X: +2494.79mm
Y: -965.52mm
Z: +1197.52mm

PNT2
X: +2442.16mm
Y: -791.02mm
Z: +1197.52mm

PNT3
X: +2454.98mm
Y: -787.15mm
Z: +1087.64mm

PNT4
X: +2507.61mm
Y: -961.65mm
Z: +1087.64mm

Flat Mirror - Object Plane

Vertices:

OB1
X: +17591.7mm
Y: +1.68mm
Z: +2369.41mm

OB2
X: +17591.7mm
Y: -2969.59mm
Z: +2369.41mm

OB3
X: +17619.2mm
Y: -2969.59mm
Z: +409.53mm

OB4
X: +17619.2mm
Y: +1.68mm
Z: +409.53mm

Dimensions:
- 14,412mm behind monocular eye point
- 2971mm wide x 1960mm tall

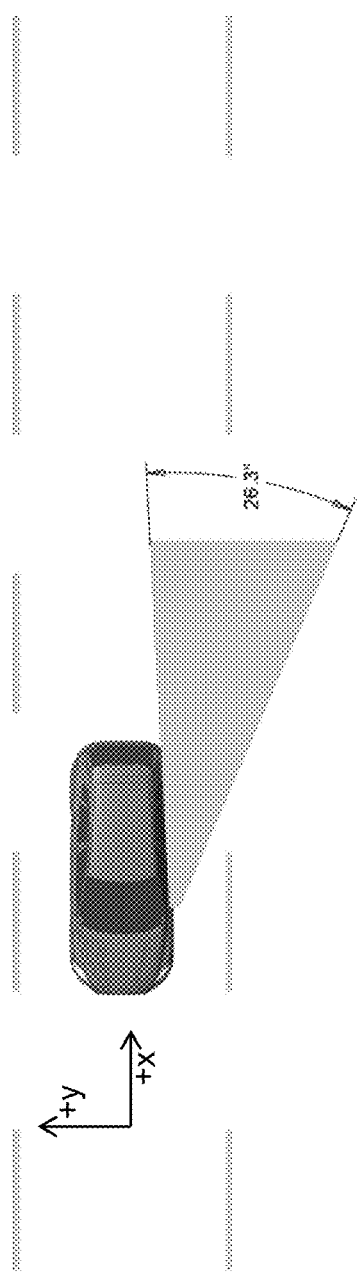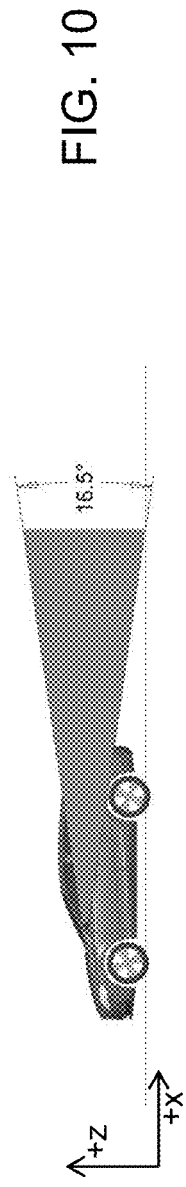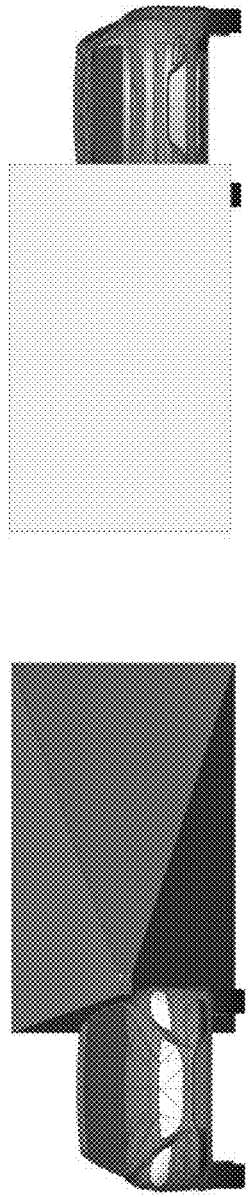
FIG. 10

Convex Mirror – Image Plane
Dimensions:
- 182.3mm wide x 111.2mm tall
Vertices:
PNT1
X: +2487.24mm
Y: -966.84mm
Z: +1201.47mm
PNT2
X: +2447.79mm
Y: -788.94mm
Z: +1196.68mm
PNT3
X: +2461.87mm
Y: -788.786mm
Z: +1086.38mm
PNT4
X: +2501.32mm
Y: -966.68mm
Z: +1091.17mm
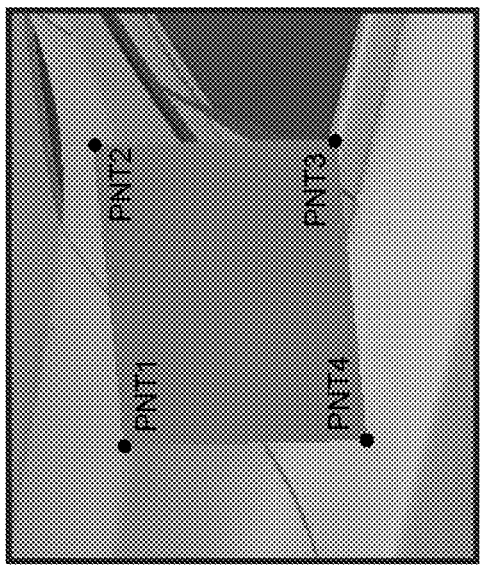
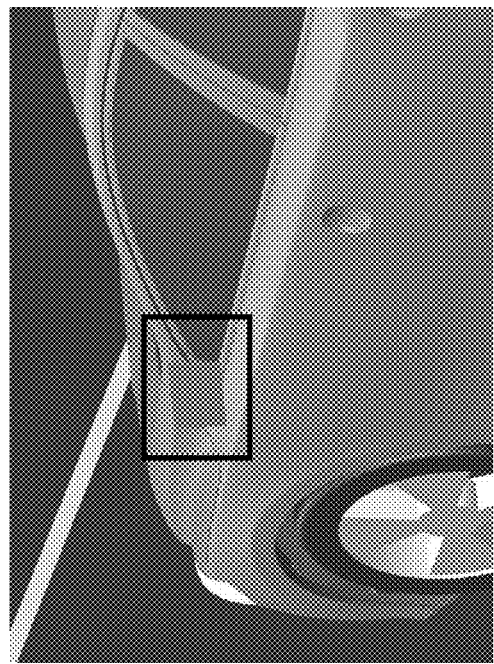
FIG. 11

Convex Mirror – Object Plane

Vertices:

OB1
X: +8749.58mm
Y: −461.02mm
Z: +2221.98mm

OB2
X: +8749.58mm
Y: −3674.62mm
Z: +2221.98mm

OB3
X: +8776.82mm
Y: −3674.62mm
Z: +285.19mm

OB4
X: +8776.82mm
Y: −461.02mm
Z: +285.19mm

Dimensions:
- 5569mm behind monocular eye point
- 3214mm wide × 1937mm tall

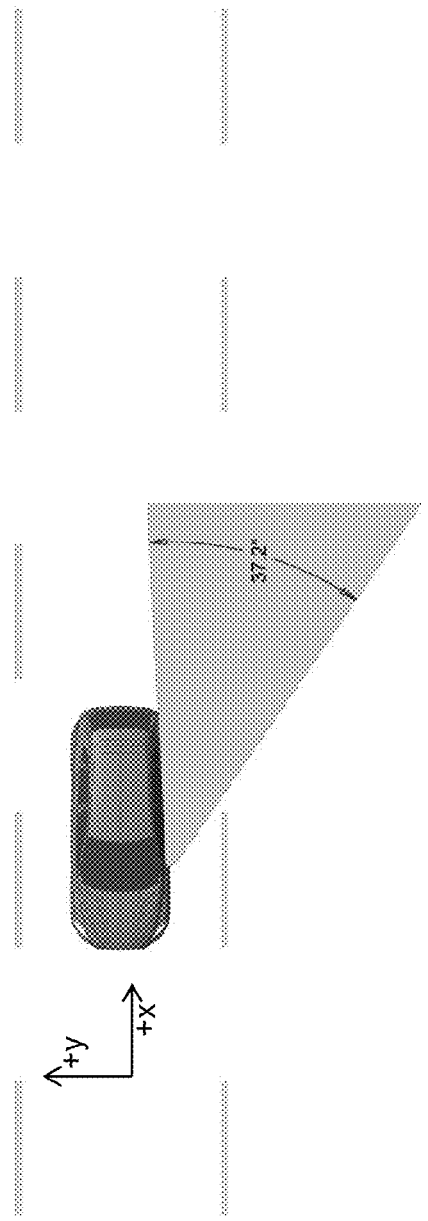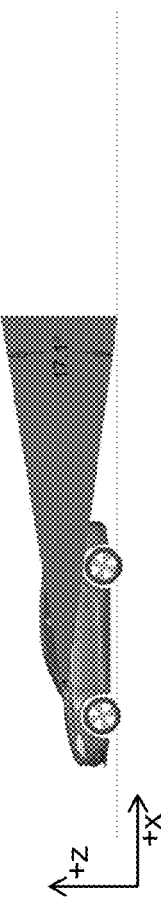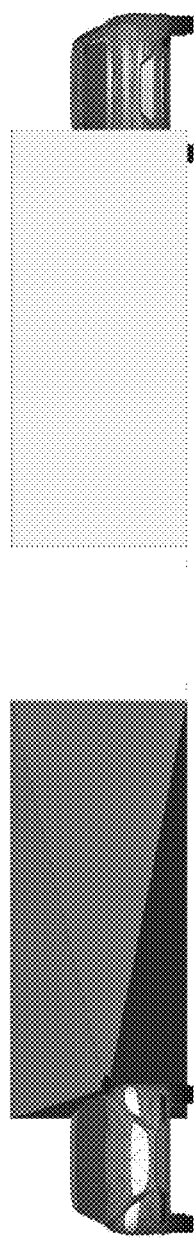
Aspheric Mirror – 1200 mm radius of curvature
FIG. 13

Aspheric Mirror - Image Plane
Dimensions:
- 182.3mm wide x 111.2mm tall
Vertices:
PNT1
X: +2486.58mm
Y: -967.049mm
Z: +1201.43mm
PNT2
X: +2447.87mm
Y: -788.986mm
Z: +1196.76mm
PNT3
X: +2462.46mm
Y: -788.706mm
Z: +1086.53mm
PNT4
X: +2501.16mm
Y: -966.77mm
Z: +1091.20mm
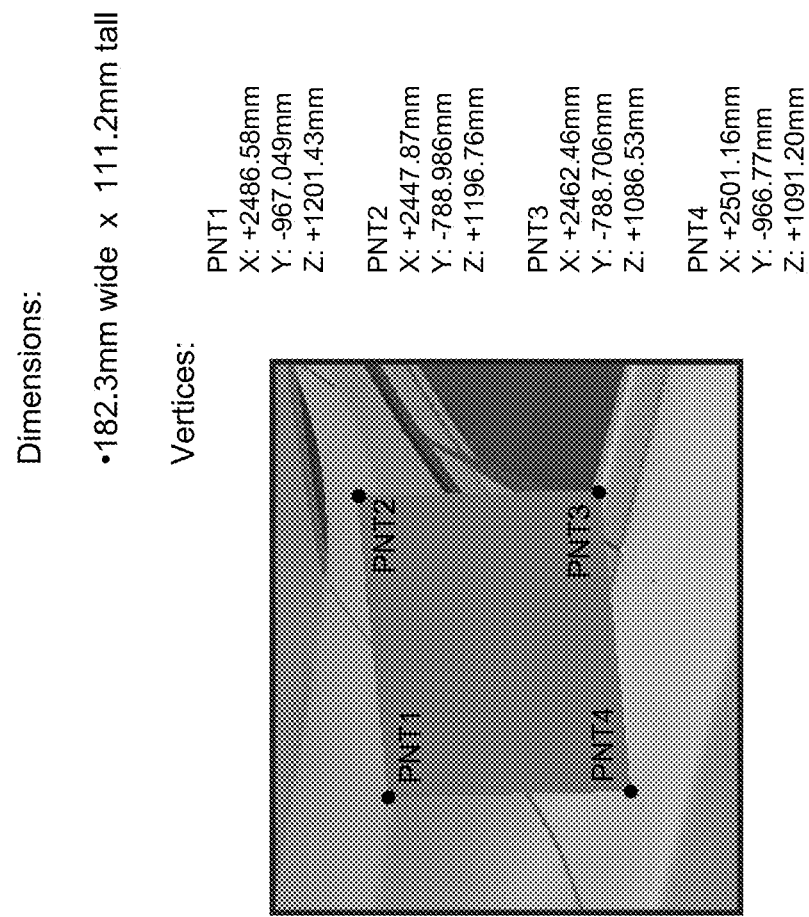
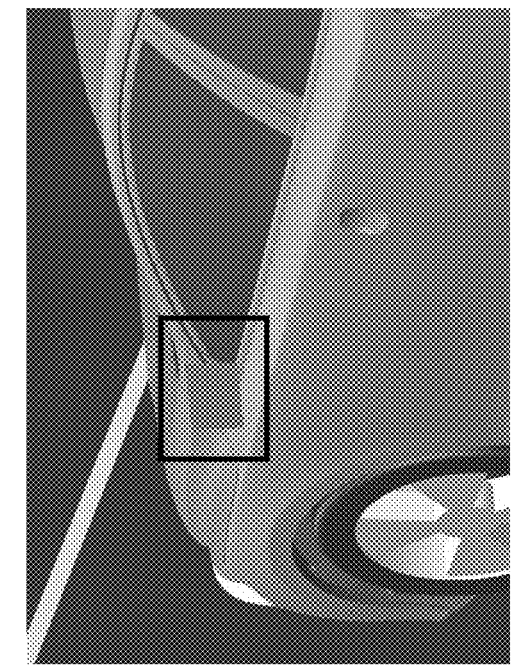
FIG. 14

Aspheric Mirror – Object Plane

Vertices:
OB1
X: +8936.50mm
Y: -450.856mm
Z: +2344.54mm

OB2
X: +8936.50mm
Y: -5359.12mm
Z: +2344.54mm

OB3
X: +8965.42mm
Y: -5359.12mm
Z: +287.844mm

OB4
X: +8965.42mm
Y: -450.856mm
Z: +287.844mm

Dimensions:
- 5757mm behind monocular eye point
- 4908mm wide x 2057mm tall

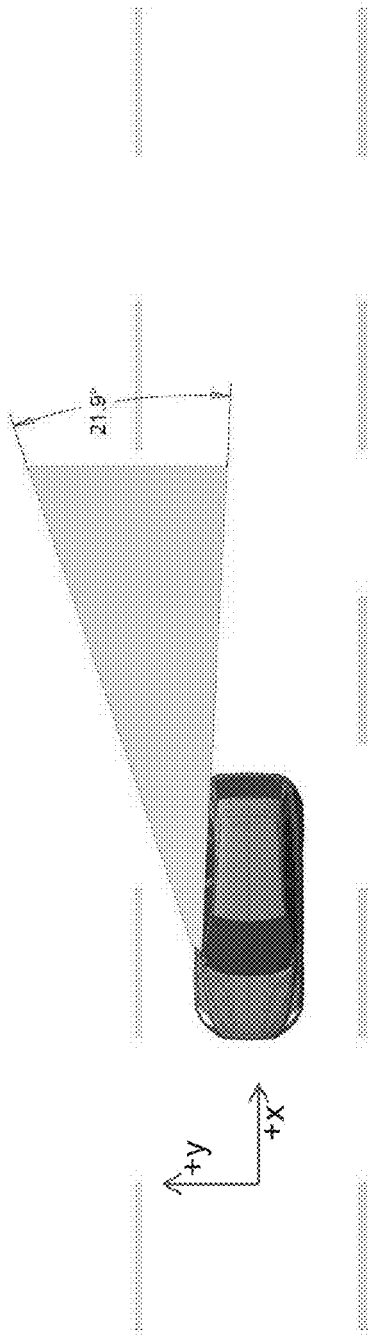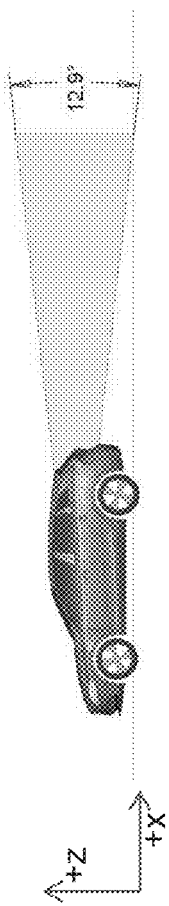
FIG. 16

Convex Passenger Side Mirror (1270 mm radius of curvature)

Dimensions:
180.3mm wide × 108.5mm tall

Vertices:

PNT1
X: +2431.36mm
Y: +794.878mm
Z: +1195.72mm

PNT2
X: +2509.67mm
Y: +957.3mm
Z: +1196.6mm

PNT3
X: +2518.43mm
Y: +953.65mm
Z: +1088.48mm

PNT4
X: +2440.12mm
Y: +791.23mm
Z: +1087.61mm

Convex Passenger Side Mirror (1270 mm radius of curvature)

Vertices:

OB1
X: +10328.7mm
Y: +3631.41mm
Z: +2197.46mm

OB2
X: +10328.7mm
Y: +380.9mm
Z: +2197.46mm

OB3
X: +10355.3mm
Y: +380.91mm
Z: +307.39mm

OB4
X: +10355.3mm
Y: +3631.41mm
Z: +307.39mm

Object Plane

Dimensions:
• 7147.2mm behind monocular eye point
• 3250.5mm wide x 1890.3mm tall

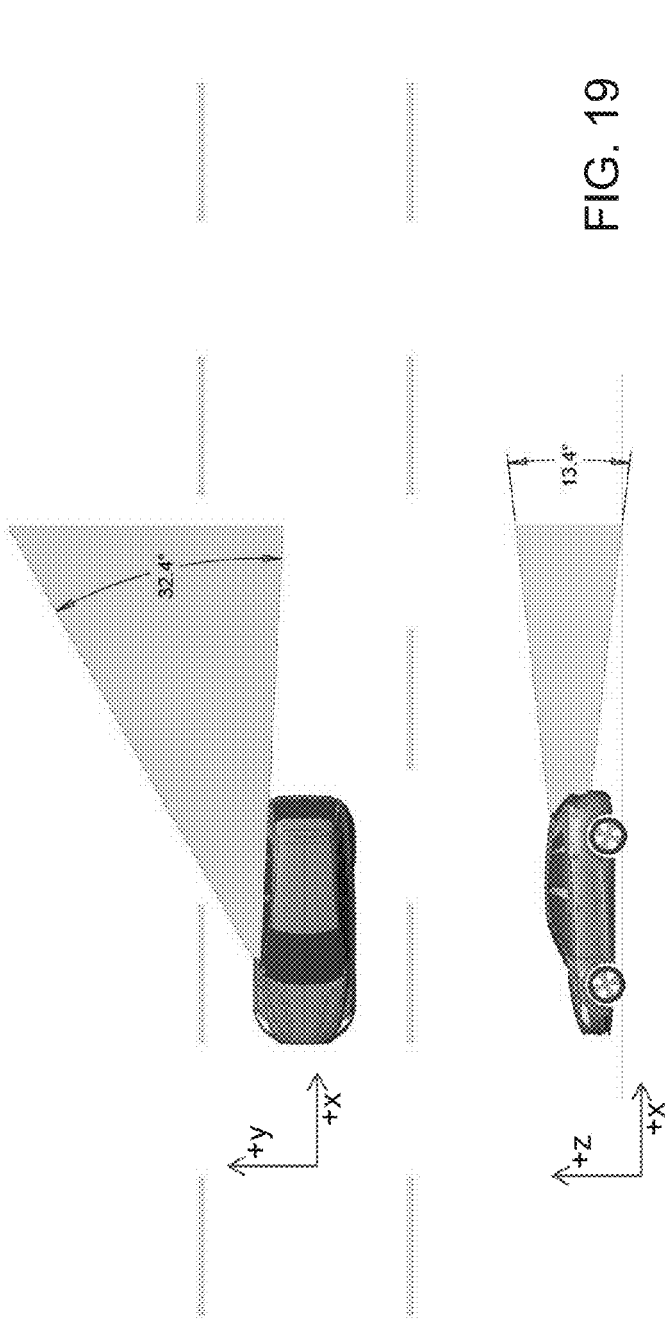
FIG. 19

Aspheric Passenger Side Mirror (1200 mm radius of curvature)
Dimensions:
- 180.3mm wide × 108.5mm tall
Vertices:
PNT1
X: +2432.08mm
Y: +794.67mm
Z: +1195.8mm
PNT2
X: +2508.81mm
Y: +957.85mm
Z: +1196.52mm
PNT3
X: +2517.69mm
Y: +954.15mm
Z: +1088.43mm
PNT4
X: +2440.96mm
Y: +790.98mm
Z: +1087.70mm
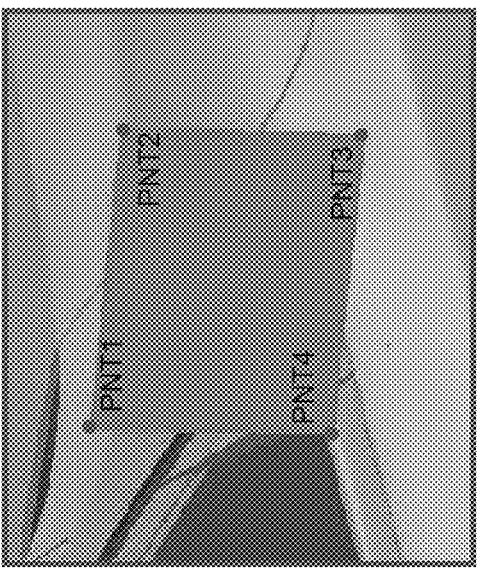
Image Plane
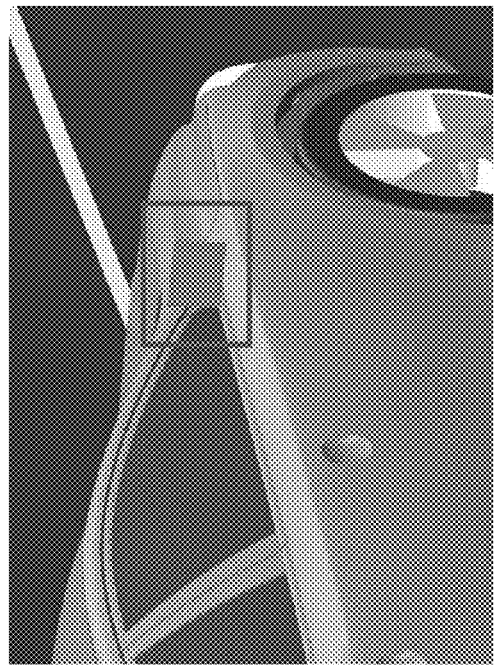
FIG. 20

Aspheric Passenger Side Mirror (1200 mm radius of curvature)

Vertices:

OB1
X: +10034.6mm
Y: +5198.21mm
Z: +2192.13mm

OB2
X: +10034.6mm
Y: +395.26mm
Z: +2192.13mm

OB3
X: +10061.1mm
Y: +395.26mm
Z: +303.25mm

OB4
X: +10061.1mm
Y: +5198.21mm
Z: +303.25mm

Object Plane

Dimensions:
•6853mm behind monocular eye point
•4802.95mm wide x 1889.1mm tall

MIRROR ASSEMBLY WITH FORMED REFLECTIVE ELEMENT SUBSTRATE

CROSS REFERENCE TO RELATED APPLICATIONS

The present application claims the filing benefits of U.S. provisional applications, Ser. No. 61/755,188, filed Jan. 22, 2013, and Ser. No. 61/673,011, filed Jul. 18, 2012, which are hereby incorporated herein by reference in their entireties.

FIELD OF THE INVENTION

The present invention relates generally to exterior rearview mirror assemblies and, more particularly, to an exterior rearview mirror assembly that has a mirror reflective element that provides a wide angle field of view to the driver of the vehicle.

BACKGROUND OF THE INVENTION

It is known to provide a vehicular exterior rearview mirror assembly that has a curved or bent reflective element to provide a wide angle rearward field of view to the driver of the vehicle. Typical automotive mirror reflective elements incorporate convex and aspheric bends to produce the desired larger or wider field of view as compared to flat mirror reflective elements. Such curved or bent reflective elements are typically disposed at passenger side exterior rearview mirror assemblies in the U.S., given that Federal Motor Vehicle Safety Standard FMVSS 111 (which is hereby incorporated by reference herein in its entirety) prescribes that the driver side mirror element be a plane or flat mirror with unit magnification.

The application of convex and aspheric mirrors typically causes distortion of images and make it difficult for a driver to gauge distance to the rear (hence the FMVSS 111 requirement for the indication that "objects in mirror are closer than they appear"). In order to limit or reduce this distortion, the radius of curvature of the reflective element is typically in the range of about 1000 mm to about 2000 mm for passenger side convex mirrors used in the U.S. If the mirror reflective element includes an aspheric wide angle optic or element at an outboard portion thereof, such aspheric regions are typically delineated or demarcated to indicate to the driver as to the extra distorted region of the mirror reflective element. The design of such bent or curved reflective elements result in design parameters for the physical size of the outside or exterior reflective element on the particular vehicle application.

Moreover, the requirement in FMVSS 111 to utilize a plane or flat driver side mirror and the desire by automakers to provide to a driver a driver side sideward/rearward field of view on the order of about 12 degrees to about 17 degrees or thereabouts requires that the outside mirror assembly that houses such a plane or flat mirror element be sized accordingly. Stylists or designers at automakers for symmetry and appearance typically desire and require that the driver side exterior mirror assembly and the passenger side exterior mirror assembly be of similar/same dimensions, appearance, styling and the like. Thus, the size of the driver side exterior mirror assembly, driven larger as it is by the requirements to use a flat (unit magnification) driver side mirror element, defacto dictates and drives the size dimensions of the passenger side exterior mirror assembly.

SUMMARY OF THE INVENTION

The present invention provides an exterior rearview mirror assembly that has a formed shape or profile or curvature that provides a substantially non-distorted wide angle field of view and that allows for a reduced size reflective element, such as a reflective element having a width dimension that preferably is no greater than about 11 cm, more preferably is no greater than about 9 cm, and more preferably is no greater than about 7 cm, and having a height dimension that preferably is no greater than about 10 cm, more preferably is no greater than 7.5 cm, and more preferably is no greater than about 6.0 cm. The field of view provided by the mirror reflective element preferably is at least about 20 degrees and more preferably is at least about 30 degrees and more preferably is at least about 35 degrees. The reflected image as seen and judged by a driver seated in and normally operating the vehicle and with such a mirror reflective element mounted at a driver side mirror assembly and/or a passenger side mirror assembly appears undistorted or substantially undistorted as such a driver is used to seeing in a flat or plane driver side mirror. The mirror reflective element is preferably formed via hydro-bending of a glass substrate of the reflective element or via other suitable forming means, and is preferably cut from a single piece blank mini-lite.

These and other objects, advantages, purposes and features of the present invention will become apparent upon review of the following specification in conjunction with the drawings.

BRIEF DESCRIPTION OF THE DRAWINGS

FIGS. 10-12 show the design parameters for a convex driver side mirror in accordance with the present invention;

FIGS. 13-15 show the design parameters for an aspheric driver side mirror in accordance with the present invention;

FIG. 16-18 show the design parameters for a convex passenger side mirror in accordance with the present invention; and FIG. 19-21 show the design parameters for an aspheric passenger side mirror in accordance with the present invention.

DESCRIPTION OF THE PREFERRED EMBODIMENTS

Figure 1:
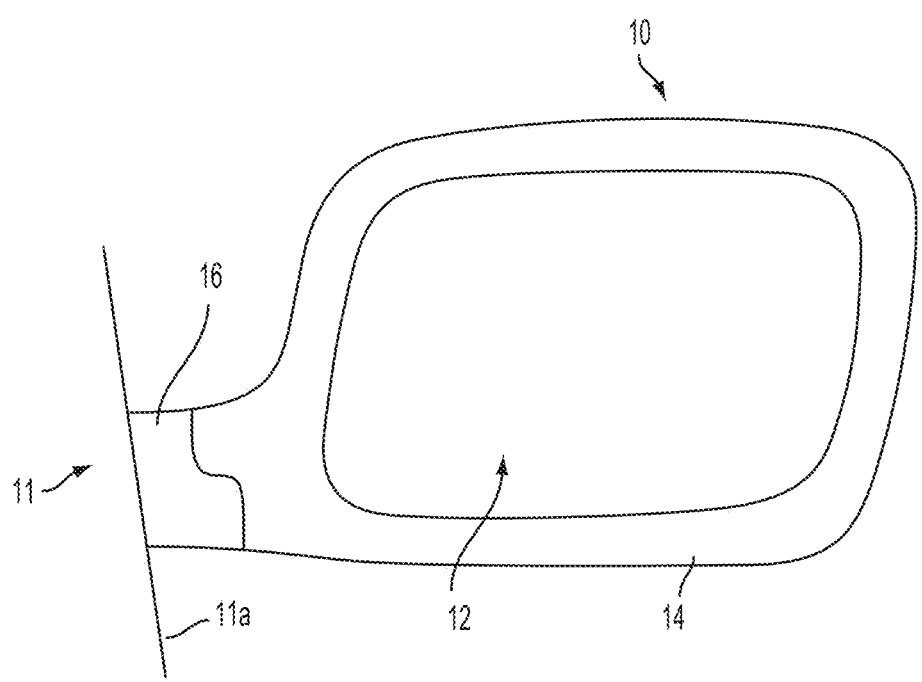
FIG. 1 is a rear view of an exterior rearview mirror assembly in accordance with the present invention.

Referring now to the drawings and the illustrative embodiments depicted therein, an exterior rearview mirror assembly 10 for a vehicle 11 includes a mirror reflective element 12 received in and/or supported at or by a mirror shell or casing or head portion 14 (FIG. 1). The mirror casing or head portion 14 may be fixedly attached at a mounting arm or base 16 at the side of the vehicle or may be movably mounted to a mounting arm or base or portion 16, and may comprise a breakaway mirror (where the mirror head portion may be manually pivoted about the mounting arm or base) or may comprise a powerfold mirror (where the mirror head portion may be pivoted via an actuator assembly or adjustment device). Mounting arm or base 16 of mirror assembly 10 is mounted at the side 11a of a host or subject vehicle 11, with the reflective element 12 providing a rearward field of view along the respective side of the vehicle to the driver of the vehicle, as discussed below.

The reflective element is formed to provide an undistorted or minimally distorted or substantially undistorted mirror image while achieving or delivering a wide angle or enhanced rearward and sideward field of view to the driver of the vehicle, such as a field of view that is at least about 15 degrees and preferably is at least about 20 degrees and more preferably is at least about 30 degrees and more preferably is at least about 35 degrees. The reflective element provides such a field of view while providing a substantially non-distorted image while comprising a reduced dimensional size reflective element, such as a reflective element having a width dimension (the lateral or horizontal dimension of the reflective element when normally mounted at the side of a vehicle) of less than about 11 cm, more preferably is no greater than about 9 cm, and more preferably is no greater than about 7 cm and a height dimension (the vertical dimension of the reflective element when normally mounted at the side of a vehicle) of less than about 10 cm, more preferably is no greater than 7.5 cm, and more preferably is no greater than about 6.0 cm. The profile or curvature of the reflective element is preferably established utilizing aspects of the transformation processes and equations described in U.S. Pat. No. 8,180,606 and/or U.S. Publication No. US-20120092784, published Apr. 19, 2012, which are hereby incorporated herein by reference in their entireties, such that the reflective element provides the desired wide angle field of view with reduced or substantially absent image distortion in the reflected image viewed by the driver when utilized on the vehicle. The reflective element and/or the process of establishing the reflective element profile may utilize aspects of the elements and processes described in U.S. Pat. Nos. 6,412,961; 6,321,570; 5,980,050; 5,938,810; 5,857,358; 4,449,786; and/or 4,264,144, and/or International Publication No. WO/2011/133400, published Oct. 27, 2011, and/or International Publication No. WO/2010/144816, published Dec. 16, 2010, which are all hereby incorporated herein by reference in their entireties.

Because the mirror reflective element of the present invention is formed to provide a desired profile that provides reduced distortion, the mirror reflective element may be used for a driver side exterior rearview mirror assembly that has a reduced size as compared to conventional flat glass driver side mirrors. For example, an exemplary flat or planar reflective element for a driver side exterior mirror assembly may have a width dimension of about 15 cm and a height dimension of about 9 cm and may provide a field of view of about 15 degrees sideward/rearward of the vehicle. In contrast, a reflective element of the present invention for use in a driver side exterior mirror assembly may provide the same or similar field of view of about 15 degrees, but may do so with a reflective element that has a width dimension of less than about 10 cm and a height dimension of less than about 6 cm. Thus, the present invention may provide a mirror assembly that provides a desired field of view but at a size that preferably is at least about 15 percent less than the size of a comparable conventional flat mirror reflective element that provides a similar or equivalent field of view to the driver of the equipped vehicle, and more preferably is at least about 20 percent less than the size of a comparable conventional flat mirror reflective element that provides a similar or equivalent field of view to the driver of the equipped vehicle, and more preferably at least about 25 percent less than the size of a comparable conventional flat mirror reflective element that provides a similar or equivalent field of view to the driver of the equipped vehicle.

Thus, for example, and in its most preferred form, utilization of a free form process (such as described in U.S. Pat. No. 8,180,606 and/or U.S. Publication No. US-20120092784, published Apr. 19, 2012, and/or U.S. Publication No. 20100033854, published Feb. 11, 2010, and/or International Publication No. WO 2011/133400, published Oct. 27, 2011, and/or International Publication No. WO 2008/094886, published Aug. 7, 2008, and/or Hicks, R. Andrew, *Controlling a Ray Bundle with a Free-Form Reflector*, OPTICS LETTERS, Vol. 33, No. 15, Aug. 1, 2008, and/or Hicks and Perline, *Blind-spot Problem for Motor Vehicles*, APPLIED OPTICS, Vol. 44, No. 19, Jul. 1, 2005, which are all hereby incorporated herein by reference in their entireties) would enable an exterior driver side rearview mirror assembly that utilizes a flat mirror reflective element of width dimension 15 cm and of height dimension 9 cm and having a field of view of 15 degrees and mounted in an exterior rearview mirror assembly mounted at the side of the vehicle to be replaced with a free form mirror reflective element of width dimension 10 cm and of height dimension 6 cm that still provides a 15 degree field of view without substantial image distortion as viewed by the driver of the vehicle. Alternatively, an exterior driver side rearview mirror assembly that utilizes a flat mirror reflective element of width dimension 15 cm and of height dimension 9 cm and having a field of view of 15 degrees and mounted in an exterior rearview mirror assembly mounted at the side of the vehicle could be replaced with a free form mirror reflective element of width dimension 15 cm and of height dimension 9 cm that provides a field of view greater than about 25 degrees and preferably greater than about 35 degrees without substantial image distortion as viewed by the driver of the vehicle.

The reflective element may comprise a single glass substrate that is bent or curved or formed to have the desired curvature or profile. The glass substrate may be coated with a mirror reflector at its rear surface before or after forming of the substrate with the desired or selected curvature or profile. Optionally, the reflective element may comprise an electro-optic reflective element, such as an electrochromic reflective element, whereby two glass sheets are formed or curved or bent to have matching desired curvatures or profiles and then mated or laminated together with an electro-optic medium sandwiched therebetween. In such an electro-optic application, the rear substrate and the reflector coated surface of the rear substrate may be formed to have the desired or appropriate or selected profile, while the front substrate is formed to generally correspond to the curvature or form of the rear substrate. The rear glass substrate may be coated with a mirror reflector at a surface thereof (such as a front or rear surface of the rear glass substrate) before or after forming of the rear glass substrate with the desired or selected curvature or profile.

The size or width and height dimensions of the outside mirror reflective element may be reduced by utilizing a free form mirror substrate that provides a desired field of view with reduced optical distortion. Nominally, the mirror reflective element may be reduced by about 15 percent to about 25 percent in size without a discernable impact to the driver's perception or field of view. The profile of the mirror reflecelement may be designed or formed so that the mirror provides reduced rectilinear distortion.

Figure 2:
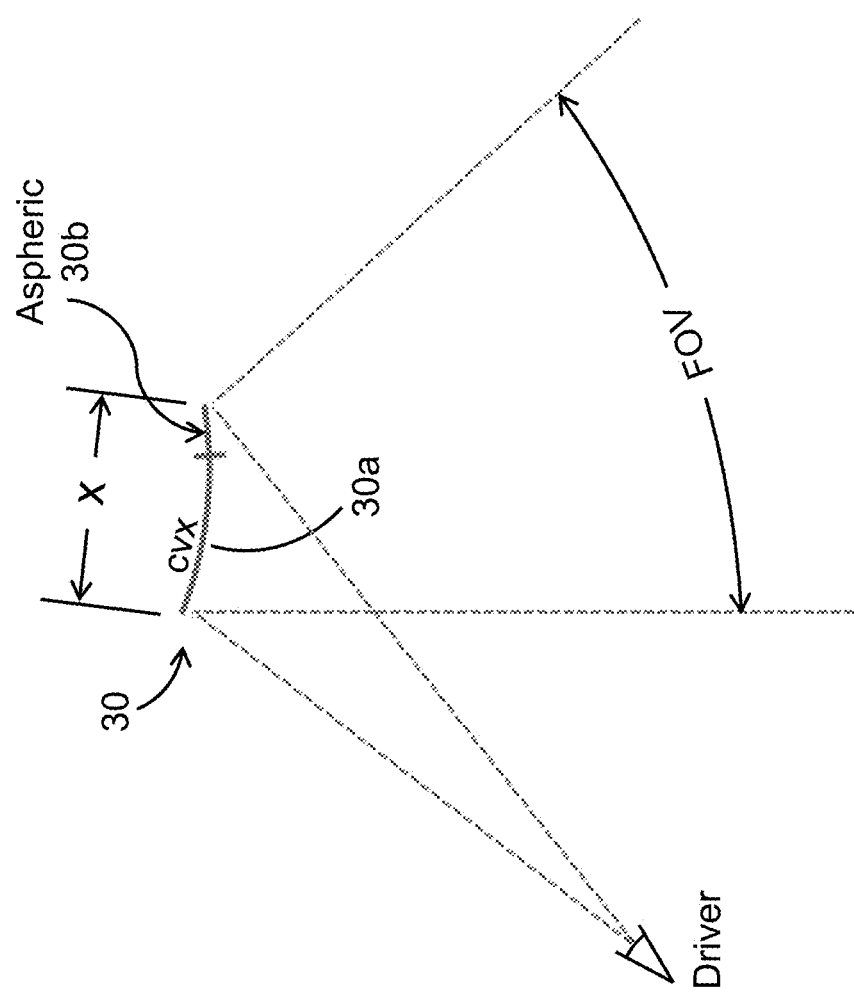
FIG. 2 is a schematic of a conventional mirror curved reflective element that provides a desired field of view.
Figure 3:
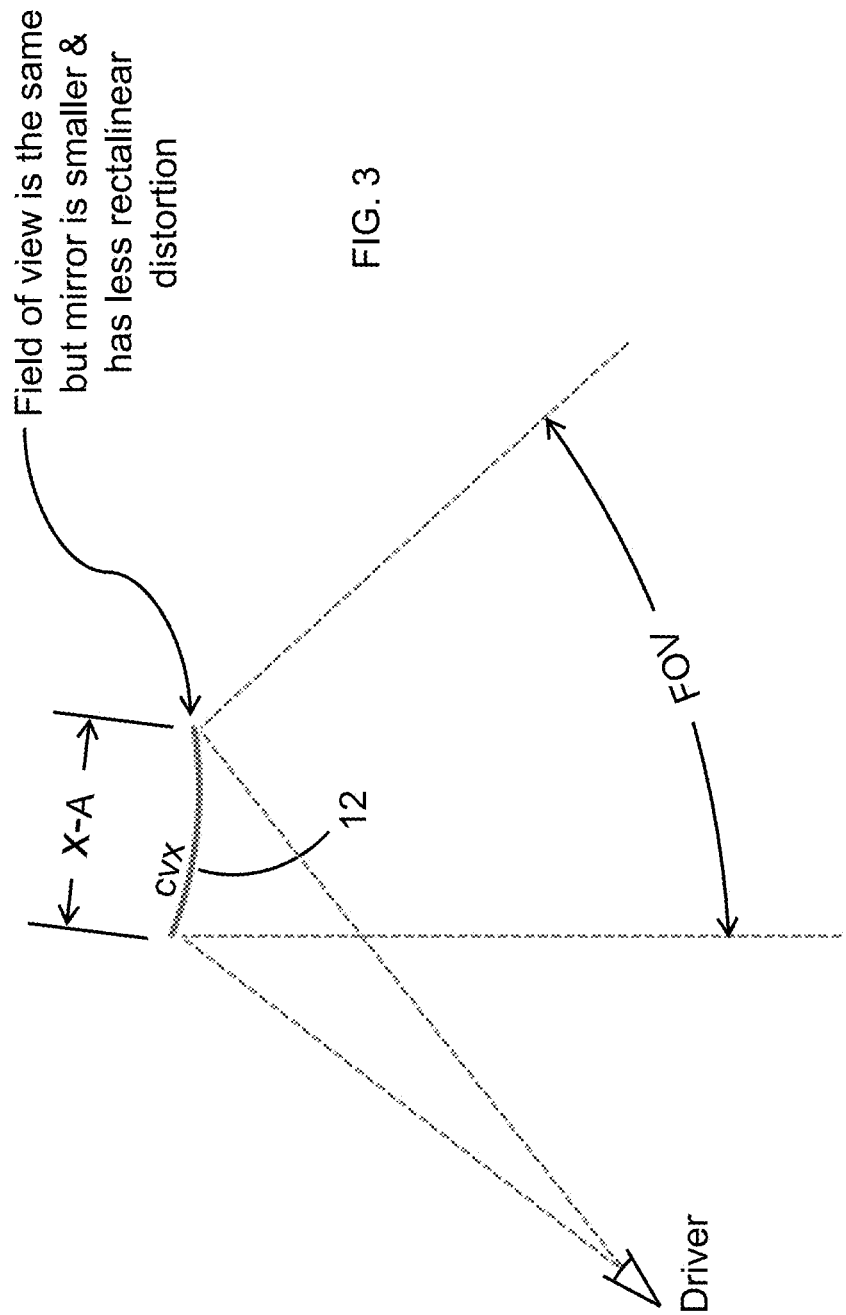
FIG. 3 is a schematic of a curved reflective element of the present invention that provides a desired field of view.

For example, and as can be seen with reference to FIGS. 2 and 3, the reflective element of the present invention provides a desired or appropriate field of view while providing a reduced size exterior mirror assembly. As shown in FIG. 2, a known or conventional mirror reflective element 30 may have a convex (cvx) curved portion 30a (a principal reflecting or viewing portion) and an aspheric auxiliary wide angle element or optic or portion 30b. The reflective element 30 has a width dimension of "X" and provides a field of view FOV. As shown in FIG. 3, the reflective element 12 comprises a curved profile and provides the same field of view FOV as the reflective element 30, but has a smaller ("X-A") width dimension and does not include an aspheric portion. Thus, the reflective element of the present invention provides about the same field of view as a conventional reflective element but is smaller and has less rectilinear distortion.

Figure 4:
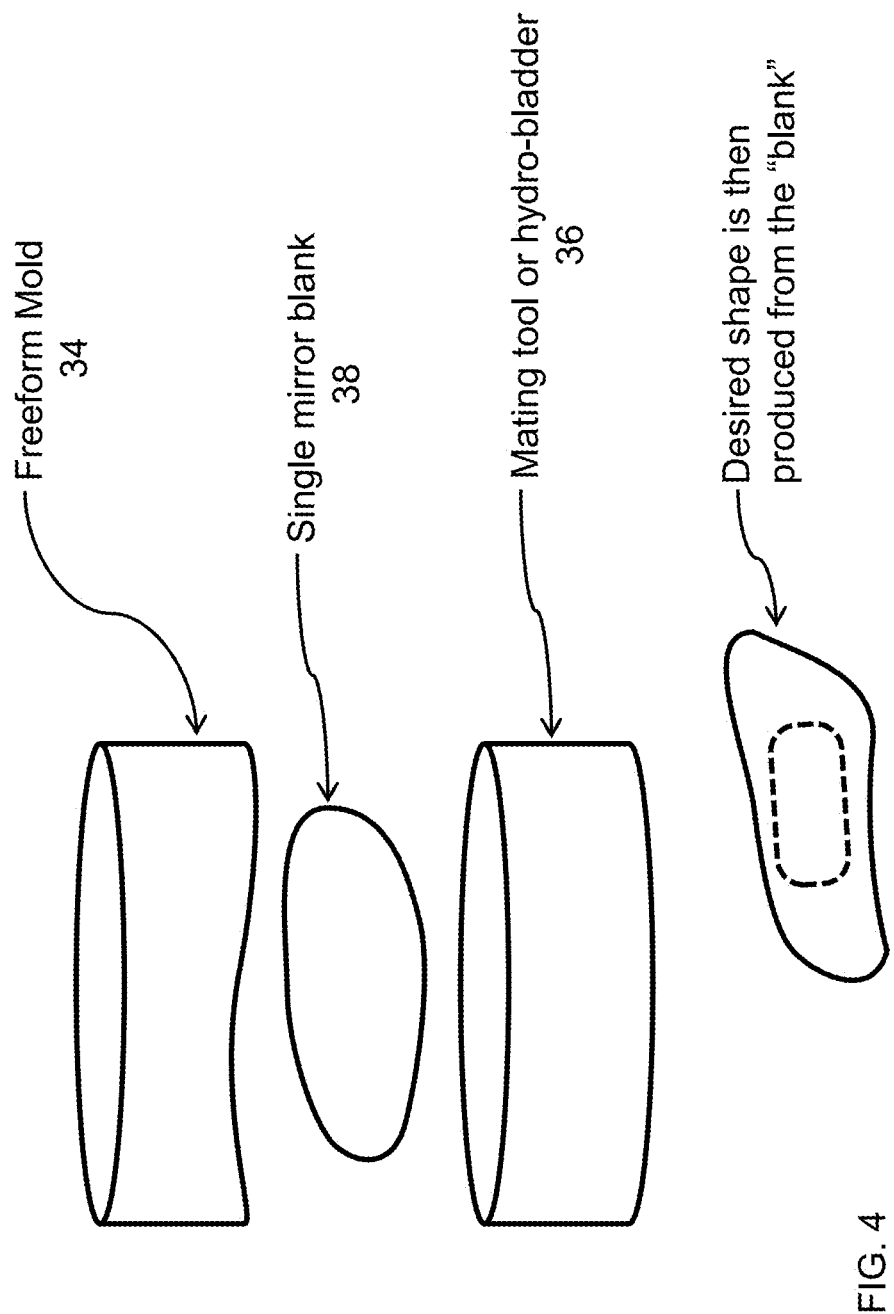
FIG. 4 is an exploded view of a process or system for forming a reflective element substrate in accordance with the present invention.
Figure 5:
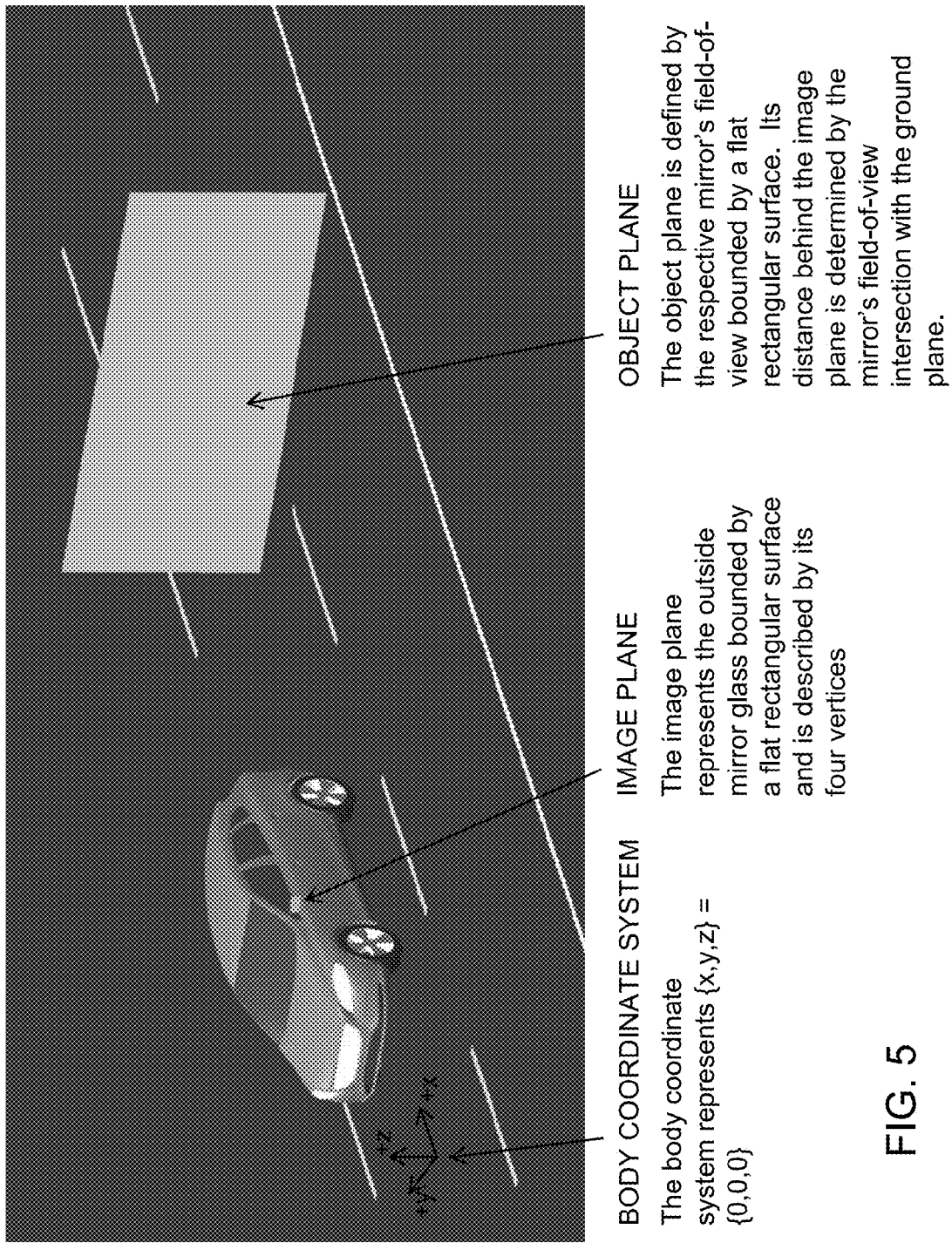
FIG. 5 is a perspective view schematic of a vehicle equipped with a mirror reflective element of the present invention and showing a coordinate system and image plane and object plane for determining or designing an appropriate mirror reflective element for that vehicle in accordance with the present invention.
Figure 6:
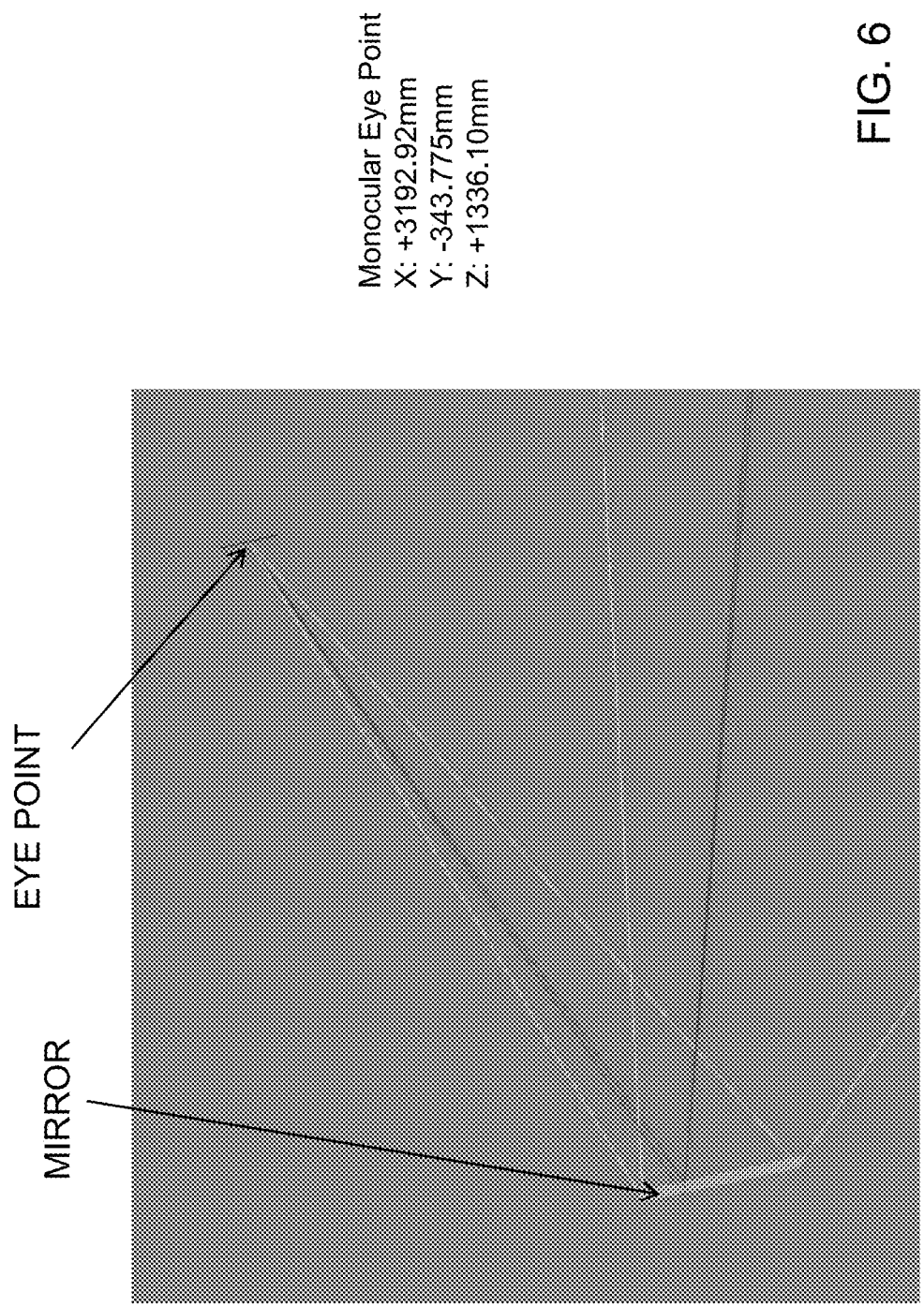
FIG. 6 is a schematic showing the coordinate location of a monocular eye point of a driver of a vehicle relative to a mirror reflective element and in the coordinate system shown in FIG. 5.

In order to mass produce such reflective elements, the reflective elements preferably may be formed via a hydro-bending process for precision bending glass substrates (such as by utilizing aspects of the systems described in U.S. Pat. No. 5,857,358 and/or 6,321,570, which are hereby incorporated herein by reference in their entireties). For example, and with reference to FIG. 4, a free form mold element or forming element 34 and mating tool or hydro-bladder 36 may be provided. The desired or selected profile formula or equation for the finished mirror reflective element is selected or calculated (such as by utilizing aspects of the calculations described in U.S. Pat. No. 8,180,606 and/or U.S. Publication No. US-20120092784, published Apr. 19, 2012, which are hereby incorporated herein by reference in their entireties) and a cutting tool (such as a computer numerical controlled (CNC) cutting tool that is programmed with the calculated or selected profile equation or equations) is used to cut or form the bending or forming surface or element so that the surface of the forming element is shaped or formed to correspond with the desired or selected mirror surface contour or profile or pattern of curvatures (desired for the final mirror element).

The mold or forming element receives or supports a single glass mini-lite substrate or blank 38 (such as a single clear piece of glass) thereat (with the glass substrate first heated to a desired elevated temperature), whereby the heated single glass mini-lite substrate or blank is formed or bent to the desired shape via the mold or forming element and the mating tool or hydro-bladder. The glass bending system or device thus forms the part or substrate or element so that the substrate has the surface contour or surface profile that corresponds to the desired or selected surface contour of the finished mirror reflective element. Although the single glass substrate is preferably formed or bent via a hydro-bending process as described above, optionally, the bending process may be performed via conventional glass bending tools, such as a male bending or forming element and a female bending or forming element. In such an application or process, both the male and female mold parts or forming parts of the bending system are formed (via one or more CNC tools programmed with the desired or selected substrate surface contour or profile equation or equations) to provide the desired profile or shape to the glass substrate or blank that is pressed and bent or formed therebetween.

For example, and as described in U.S. Pat. Nos. 5,857,358 and/or 6,321,570, which are hereby incorporated herein by reference in their entireties, the method of and apparatus for bending the blank or sheet of material includes heating the blank or sheet of material to a formable, state such as glass, resinous polymeric material, viscoelastic material, and thermoplastic material. The bending method and system provides an improved pressing member for pressing the heated sheet against a first rigid mold which reduces the size of the buckles in the bent sheet, eliminates the need for a second rigid mold, reduces the process control steps, reduces the risk of damaging the rigid mold, increases the tolerances for the positioning of the sheet in the apparatus; and increases the range of application. The pressing member includes a flexible diaphragm which rolls the heated sheet against a rigid mold by first applying a pressure to a portion of the heated sheet and then radiating the pressure from that portion to the remaining surface area of the heated sheet in a rolling action. The bending apparatus includes a rigid mold and a flexible diaphragm pressurized into a convex shape for initially pressing on a portion of the heated sheet. A control system moves the pressing member toward the rigid mold and maintains the pressure on the flexible diaphragm so that as the pressing member is moved toward the rigid mold, the flexible member generally conforms to the shape of the rigid mold and rolls the heated sheet onto the rigid mold. To further reduce the size of any buckles, a holder for supporting the heated sheet between the rigid mold and the flexible diaphragm is provided. The holder includes a support surface for supporting the heated sheet generally planar before bending.

By creating a mold part or forming or bending element or elements that is/are formed or shaped (via a CNC tool programmed with the desired or selected substrate surface contour or profile equation or equations) to form or bend a specific free form mirror from a single mirror blank, many automotive mirror reflective elements may be produced to the desired free form reflective surface without the development of individual tools. The blanks thus may be formed or bent to provide the desired surface contour or profile or curvature and then may be cut or ground to the desired final shape and size for the particular application. The free formed mirror reflective elements thus can generate a variety of specific optical solutions and thus provide enhanced mirror reflective elements and processes over the conventional mirror reflective elements and manufacturing processes in use today.

Thus, for example, a mold part or forming element (such as a mold part of a hydro-bending molding system or the like) may be provided that has a forming surface that corresponds to a determined or selected or calculated profile. The desired curvature or surface profile of the reflective element (such as calculated in accordance with the transformation equations described in U.S. Pat. No. 8,180,606 and/or U.S. Publication No. US-20120092784, published Apr. 19, 2012, which are hereby incorporated herein by reference in their entireties) is entered or programmed into a computer numerical controlled (CNC) tool that then cuts or forms the mold element or forming part accordingly so that the mold element or forming part has the selected or calculated surface contour or profile. An oversized piece of flat glass is provided and placed in or at the forming part (such as in the forming part and between the forming surface and the hydro-bladder or such as between a male forming part and a female forming part) and is bent or formed therein (such as via a hydro-bladder molding system or via two formed forming parts that correspond with one another, such as for a male-female type of glass bending assembly or device) to form a free form mirror substrate. The mirror substrate is reflector coated (with the coating established before or after the molding or forming or bending process) and then may be ground or finished to provide the completed mirror reflective element or substrate for use in a driver side exterior mirror assembly of a vehicle.

Thus, the present invention provides an enhanced process for manufacturing mirror substrates for exterior mirror reflective elements for exterior or outside mirror assemblies for vehicles. The mirror substrates and reflective elements of the present invention provide a desired or enhanced field of view with reduced or minimal distortion, and are manufactured in a manner that allows for mass production of the substrates and reflective elements. The present invention thus provides an exterior driver side rearview mirror assembly that provides a desired wide angle field of view with reduced or minimal distortion and with a reduced size reflective element and thus reduced size mirror housing or casing, so as to provide an enhanced appearance and enhanced aerodynamics to the exterior mirror assembly that is mounted at the side (such as at the passenger side and/or the driver side) of a vehicle. For example, the exterior mirror assembly of the present invention may provide a desired wide angle field of view via a mirror assembly that is at least about 15 to 25 percent smaller than a typical flat mirror or the like that provides a similar field of view with unit magnification.

Aspheric automotive exterior mirror elements are known in the automotive mirror art, and are widely used for driver side automotive exterior mirror elements in Europe and elsewhere (though not in the USA as they do not comply with FMVSS 111 if used on the driver side of an equipped vehicle). A conventional aspheric automotive exterior mirror element typically has a main viewing portion separated from an outboard wide-angle viewing portion by a demarcation line. The main viewing portion (located closer to the body-side of the equipped vehicle than the outboard wide-angle viewing portion when mounted at the driver side of the equipped vehicle) typically has a spherical bent convex curvature, typically of around a 2,000 mm convex radius of curvature or around a 1,400 mm convex radius of curvature or around a 1,300 mm convex radius of curvature or around a 1,250 mm convex radius of curvature. The radius of curvature of the outboard wide-angle viewing portion progressively decreases from the demarcation line out to the furthest outboard extremity of the aspheric mirror element and can decrease in radius of curvature to likes of around 200 mm (or smaller) at its outboardmost extremity.

Currently, driver side aspheric outside mirror reflective elements are commonly used to enhance the field of view of the driver of the likes of European vehicles. Such known aspheric mirrors accomplish this by providing an ever decreasing radius of curvature outboard of a typically convex portion of the mirror reflective element. While the rearward field of view of the driver of the vehicle is appreciably increased, spatial distortion occurs in a rate increasing through the aspheric range of the mirror reflective element. Due to this spatial distortion, known aspheric mirror reflective elements effectively provide awareness of objects in the extended field of view, but typically do not provide any guidance as to the object's proximity to the vehicle. As a result, drivers of such equipped vehicles must frequently turn their head away from the forward view in order to ascertain the position of objects and the relative ability to maneuver around them.

The present invention provides a mirror reflective element that is designed and developed to correct the rectilinear distortion of known aspheric mirror reflective elements while maintaining a substantially similar field of view in the horizontal axis. Additionally, the mirror reflective element of the present invention can be configured and arranged to maintain a vertical field of view commonly found on convex or even flat mirror reflective elements. The combination of these aspects allows a driver of a vehicle equipped with an exterior mirror reflective element of the present invention to achieve a wider field of view and have a better perception of spatial relationships as the driver's rearward view is substantially non-distorted or is no longer distorted. Additionally, maintenance of the vertical field of view that is similar to a convex mirror reflective element or a flat mirror reflective element allows the driver to maintain a consistent angle of observation for objects in the vertical axis. This provides the driver with a consistent sense of distance for objects behind the vehicle.

A mirror reflective element of the present invention is designed or configured to provide a desired rearward field of view to the driver of the vehicle when the mirror reflective element and exterior rearview mirror assembly are normally mounted at the vehicle and when the driver of the vehicle is normally operating the vehicle. As described in U.S. Pat. No. 8,180,606, incorporated above, a desired curvature or profile of a reflective element that provides reduced distortion may be determined by entering coordinates of a view point and coordinates of an image plane that will provide a desired angled field of view to a person viewing from the view point. Such an approach may provide a reflective element that provides a reduced distortion rearward field of view, but it may not provide the desired rearward field of view (having a desired width and height at a prescribed distance rearward of the vehicle) for a particular mirror application at a vehicle.

In accordance with the present invention, and with reference to FIGS. 5-21, a body coordinate system for a vehicle is used to define the location in space (relative to an origin of the body coordinate system) of a monocular eye point (approximating a location where a driver views from for a typical driver of the vehicle), an image plane representative of the mirror reflective element at the side of the vehicle, and an object plane that defines the size and shape and border of the rearward field of view at a distance behind the image plane or mirror reflective element that is determined by where the rearward field of view of the mirror reflective element intersects the ground plane at which the vehicle is located. In other words, the object plane represents the field of view at a location rearward of the vehicle that will fill or be encompassed by the rearward field of view of that mirror reflective element. The present invention utilizes the body coordinate system for determining points in space that frame or define the image plane and the desired or appropriate object plane for any given application of an exterior rearview mirror. These coordinates can be entered into equations of the types described in U.S. Pat. No. 8,180,606 to calculate and determine an appropriate profile of a mirror reflective element that will provide a rearward field of view that will encompass the determined or prescribed object plane and that will provide reduced distortion of the reflected image that is viewed by the driver of the vehicle.

Figure 7:
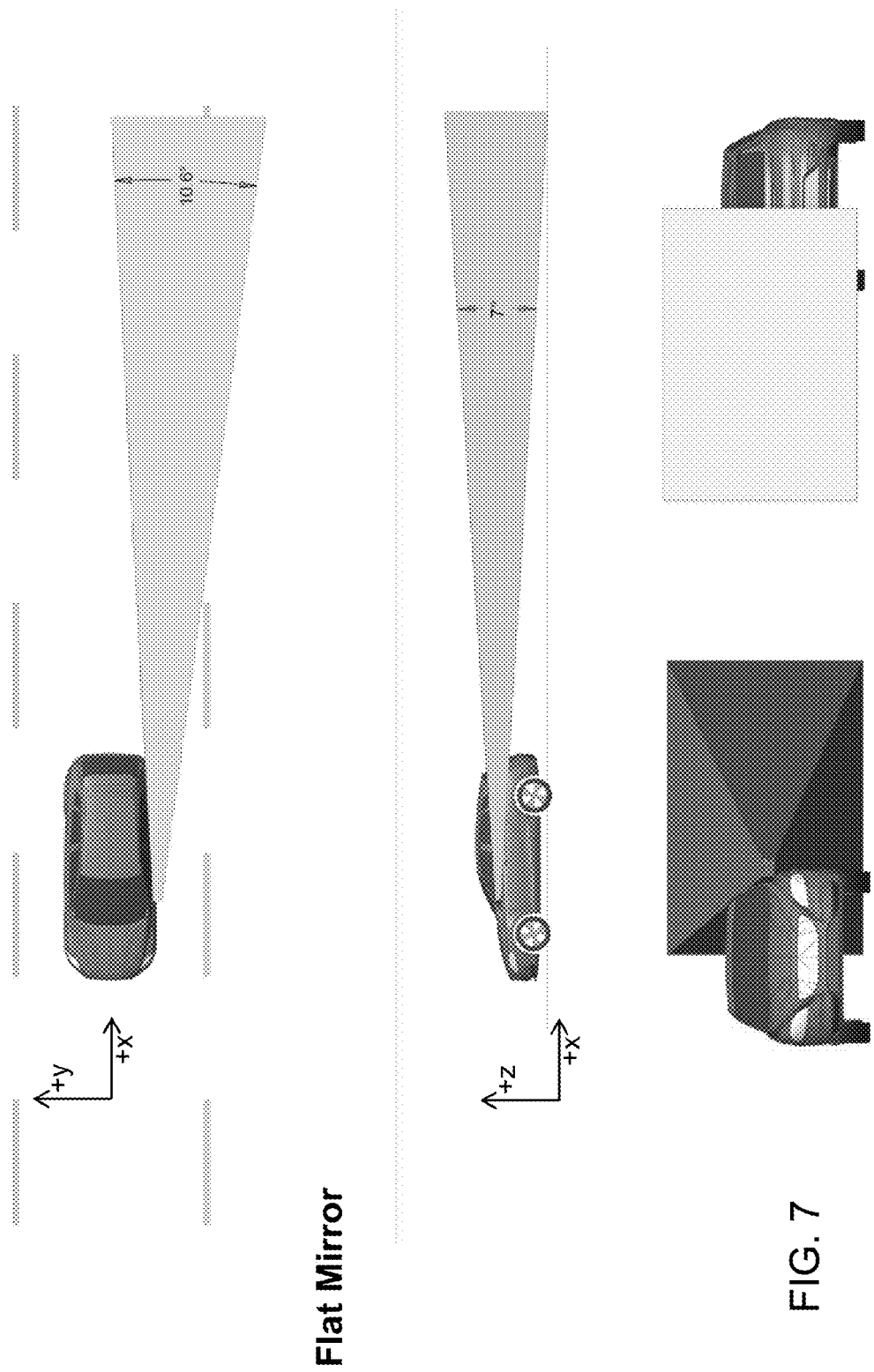
FIGS. 7-9 show the design parameters for a flat driver side mirror in accordance with the present invention.
Figure 8:
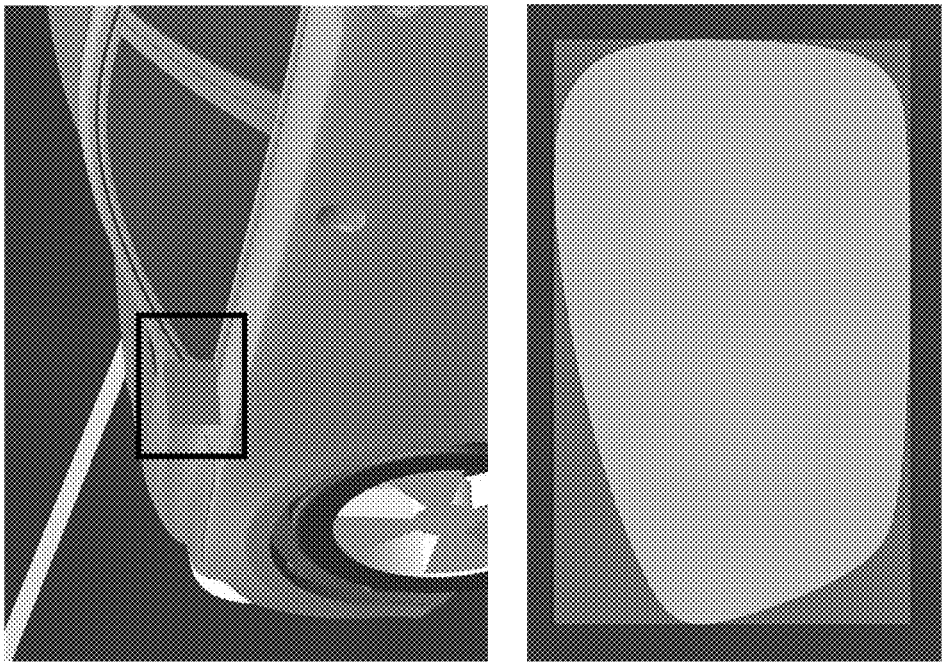
Figure 9:
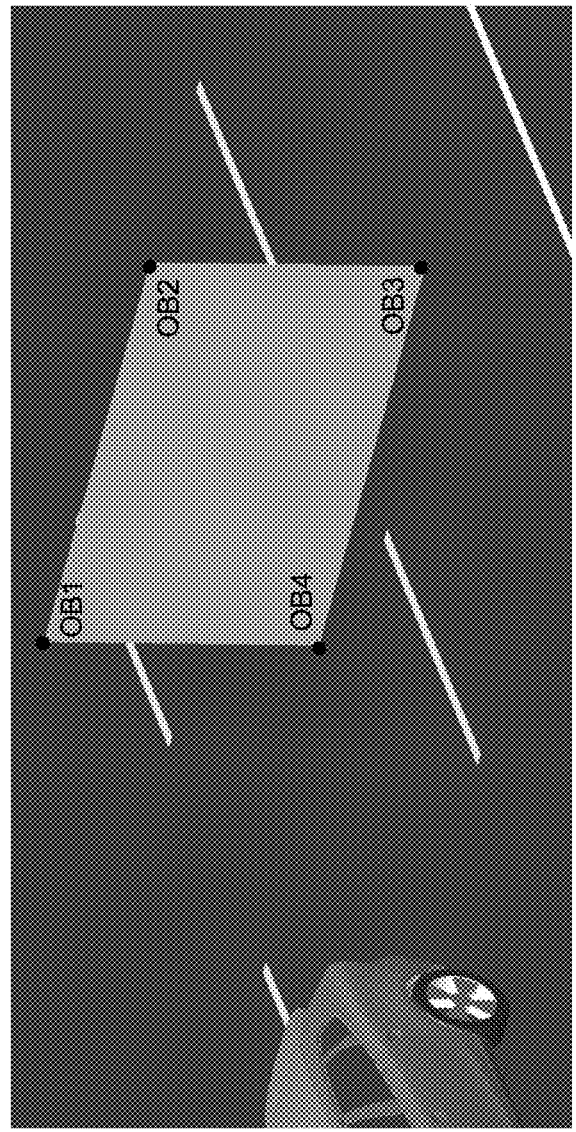

FIGS. 7-9 illustrate an example of an image plane and object plane for a flat driver side mirror reflective element. In the illustrated example, the image plane of the mirror reflective element (including the size and coordinates of a rectangular frame or plane that encompasses the desired design shape of the reflective element) and the monocular eye point are determined by the vehicle design (which may be dictated by the vehicle manufacturer). As can be seen in FIG. 8, the image plane comprises a rectangular plane that encompasses the rounded or desired shape of the reflective element for that vehicle, with the image plane being defined by the corner points (PNT1, PNT2, PNT3, PNT4) of the image plane in the vehicle coordinate system. The example shown in FIG. 8 thus provides for a 182.3 mm wide by 111 mm tall image plane and reflective element. Based on the coordinates of the monocular eye point and the image plane, the coordinates of the corners of the object plane can be determined or calculated. The object plane is determined by where rays that emanate from the monocular eye point reflect off the image plane (in this example having a flat reflective surface) and intersect the ground plane. At that x-location (longitudinal distance rearward from the vehicle) the lower boundary of the object plane is determined and the corner coordinates (OB1, OB2, OB3, OB4) of the object plane are determined or calculated by where rays from the corners of the image plane intersect the plane that is through the ground plane intersection and generally normal to a center line ray of the image plane. As can be seen in FIG. 9, the example given for that particular vehicle application has an object plane that is about 14,412 mm behind the monocular eye point and is about 2971 mm wide and about 1960 mm tall.

Figure 12:
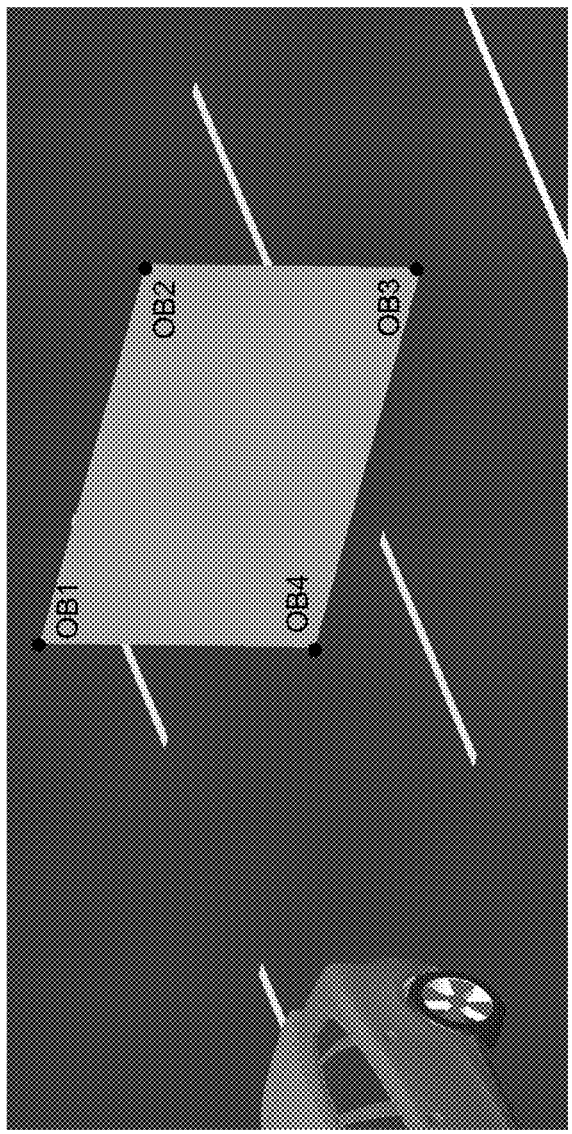
Figure 15:
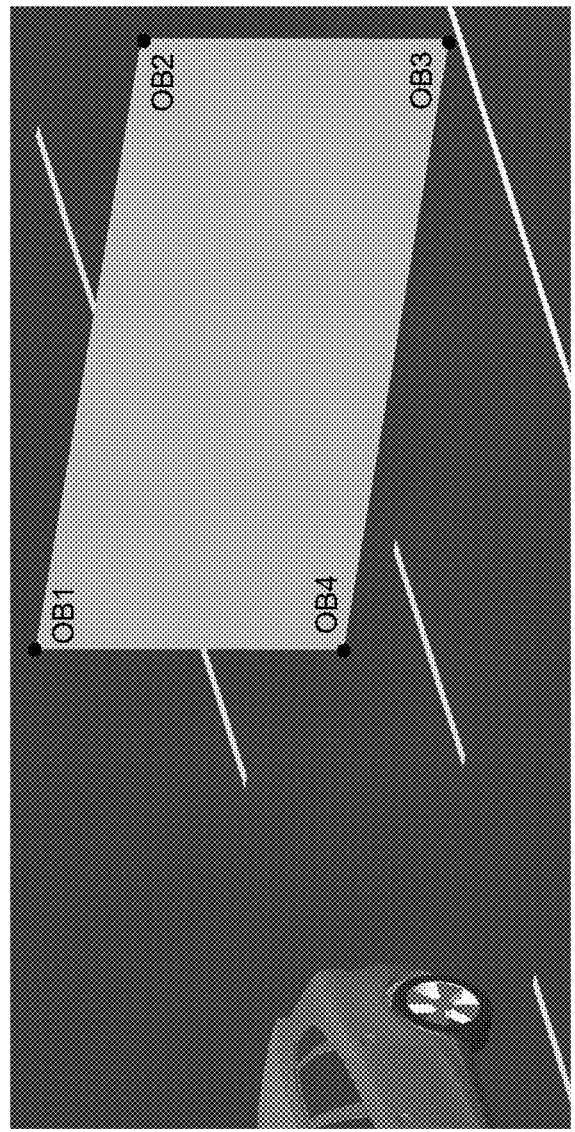
Figure 17:
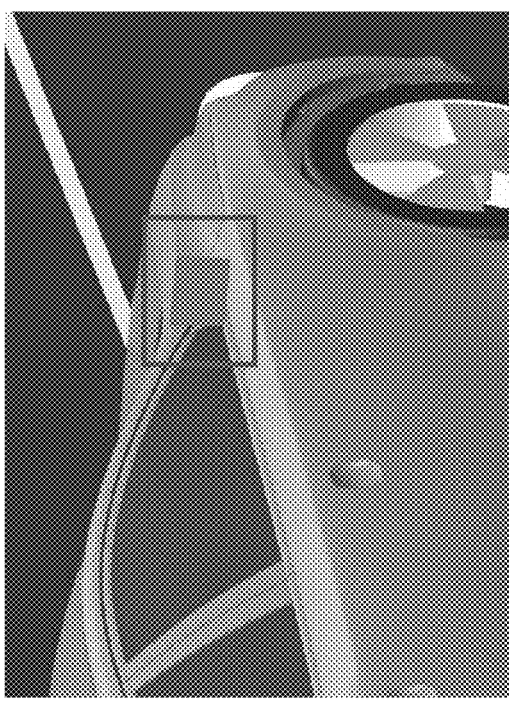

Referring now to FIGS. 10-12, a similar example, but for a convex driver side mirror reflective element (having about a 1270 mm spherical radius of curvature) is shown. In this example, the size or cross dimensions of the image plane are similar to the flat mirror example, but the object plane (as shown in FIG. 12), due to the spherical convex curvature of the reflective element, is substantially wider than the object plane determined for the flat reflective element, and is substantially closer to the vehicle than the object plane for the flat reflective element. Similarly, and with reference to FIGS. 13-15, an example is provided for an aspheric mirror reflective element, again having similar monocular eye point and image plane coordinates as above. As can be seen in FIG. 15, the object plane of this example, with the same size image plane as in the other examples, provides a substantially wider field of view at the location where the rays intersect the ground plane (which, due to the curvature of the reflective element, is much closer to the vehicle and monocular eye point than in the flat mirror example).

Figure 18:
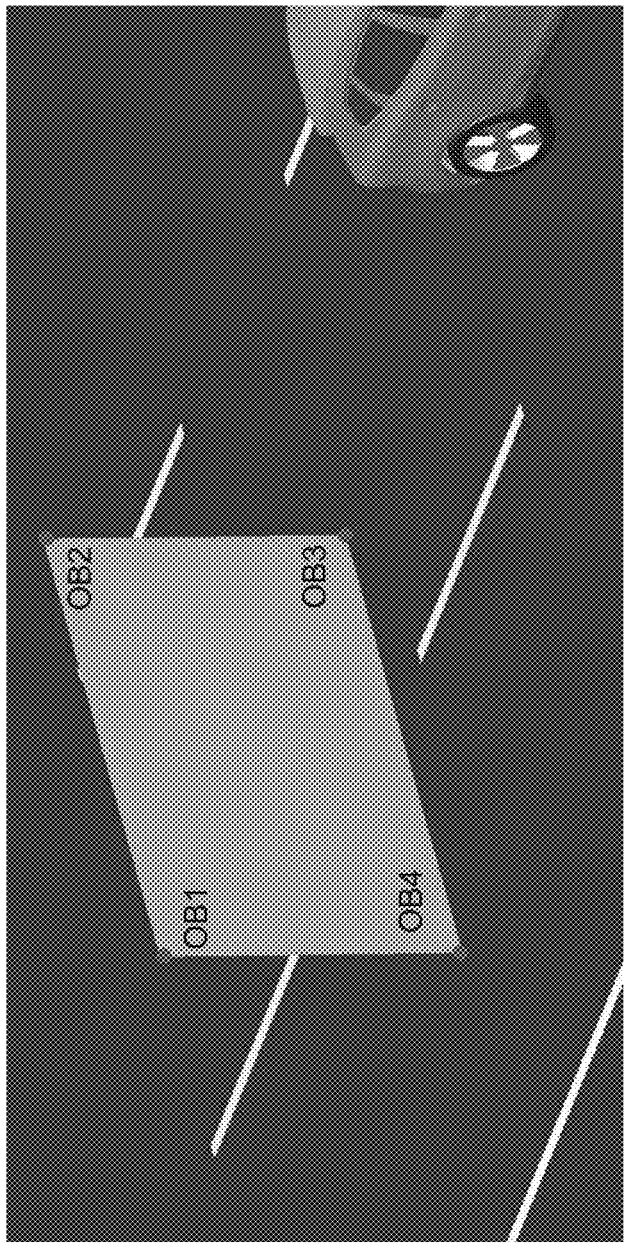
Figure 21:
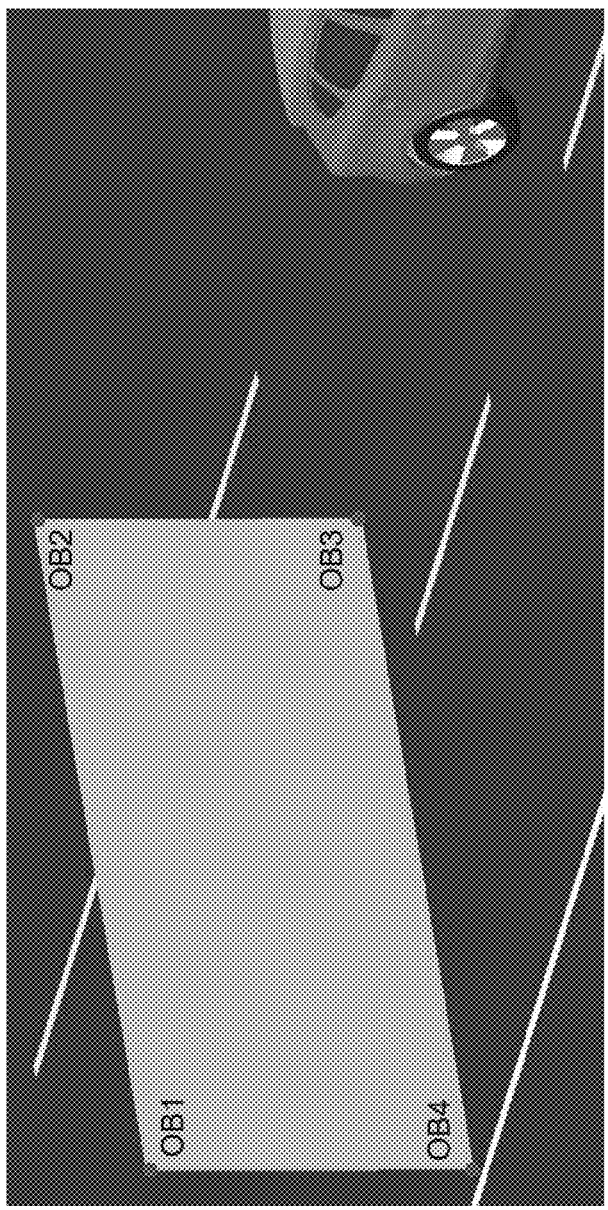

Although shown and described above as being suitable for use in designing a driver side mirror reflective element, aspects of the present invention are suitable for use in designing passenger side mirror reflective elements. For example, and with reference to FIGS. 16-18, a convex passenger side mirror reflective element (having about a 1270 mm spherical radius of curvature) is shown. In this example, the size or cross dimensions of the image plane are similar to the driver side mirror examples (and for the given vehicle, the monocular eye point is at the same or approximately the same or similar coordinates as above), but the object plane (as shown in FIG. 18), is further rearward of the vehicle than the object plane for the convex reflective element at the driver side of the vehicle. Similarly, and with reference to FIGS. 19-21, an example is provided for an aspheric passenger side mirror reflective element, again having similar monocular eye point as above and similar image plane coordinates as the convex version. As can be seen in FIG. 21, the object plane of this example, with the similar size image plane as in the other examples, provides a substantially wider field of view at the location where the rays intersect the ground plane (which, due to the curvature of the reflective element, is further rearward of the vehicle than in the aspheric driver side mirror example).

Thus, for any given application of a reflective element at a side of a vehicle (such as the passenger side and/or driver side of the vehicle), the coordinates for a desired object plane can be readily determined in the vehicle body coordinate system. For example, the coordinates for an image plane of the reflective element and the monocular eye point of a typical driver of a vehicle can be readily determined for that vehicle (and may be defined or limited or prescribed by the vehicle manufacturer). The determined object plane is representative of a desired field of view for the exterior rearview mirror of that particular vehicle, and may be selected to provide a wider angle field of view, if that is what is desired for that application. Once the coordinates of the monocular eye point, PNT1, PNT2, PNT3 and PNT4 are known, the coordinates of the object plane OB1, OB2, OB3 and OB4 can be calculated or determined, and then all of these coordinates (or coordinates based on these coordinates but transformed into an appropriate coordinate system, such as one that has, for example, the center of the image plane as its origin) may be input into equations of the types described in U.S. Pat. No. 8,180,606, whereby a profile for a reflective element that will provide the prescribed object plane or rearward field of view for that particular application can be determined.

Thus, for any given vehicle application, having a prescribed reflective element size and location, if it is desired to provide a wider rearward field of view, the coordinates of an appropriate wider object plane (determined based on the relationship between the image plane and monocular eye point and ground plane) can be readily determined and input into the equations. For example, for a given image plane and monocular eye point, the object plane can be determined by the location to the rear of the vehicle where the rays intersect the ground plane, and these coordinates can be entered into the appropriate free form equations.

When a vehicle manufacturer designs a new vehicle body, it decides in space an origin in space (forward of the vehicle) and every thing in the car has a body coordinate position relative to that origin. Thus, the monocular eye point and coordinates PNT1, PNT2, PNT3, PNT4 of the image plane should be readily determinable in that coordinate system, since they are likely based on vehicle design parameters. The image plane represents the location of a flat rectangular surface at the mirror reflective element (rectangular mirror) that will encompass or bound the designed shape of the mirror reflective element for that vehicle. The object plane is then determined to be the plane rearward of the vehicle that would fill that rectangular surface or image plane at the location where the rays intersect the ground plane.

Thus, in accordance with the present invention, the coordinates of the monocular eye point and the corners of the image plane and the corners of the object plane may be readily determined for a mirror system having a desired wide angle field of view, and these coordinates (or other parameters or coordinates based on these coordinates) may be input into equations of the types described in U.S. Pat. No. 8,180,606, whereby the equations can provide a reflective element profile that will provide the desired rearward field of view with reduced distortion. Thus, for any given vehicle design and mirror parameters, the equations can determine a rectangular reflective element of the prescribed dimensions. The equations provide a free form surface or profile that provides the desired or designated rearward field of view that will encompass the determined object plane for that vehicle, and that has reduced distortion of reflected images. Thus, the present invention provides a process or system or formula for determining the desired design parameters for an exterior rearview mirror reflective element for any given vehicle application, and uses those parameters or coordinates to calculate a free form reflective element (as a function of the size of the reflective element and object plane) that provides a desired or appropriate or prescribed reduced distortion rearward field of view.

Optionally, the principles of the free form mirror reflective element design and forming process of the present invention can be applied to reflective elements of interior rearview mirror assemblies, whereby a mirror reflective element of an interior rearview mirror assembly is provided or configured or formed that has a wider rearward field of view than a normal or conventional flat interior mirror reflective element, while providing a reduced distortion or substantially non-distorted rearward field of view. Such a wider field of view may provide reduced distortion viewing of areas within the vehicle cabin, such as for viewing a child in a rear seat or the like. Optionally, the interior mirror reflective element, when the mirror assembly is normally mounted in the vehicle, may have its wider field of view encompass the side windows at either or both sides of the vehicle, which may allow the driver of the vehicle to view, at the interior rearview mirror assembly, the side lane adjacent to the driver side of the vehicle and/or the side lane adjacent to the passenger side of the vehicle. Optionally, the mirror reflective element may be formed so that the extended field of view may be biased towards or may encompass more of a side lane area at one side of the vehicle more than the side lane area at the other side of the vehicle (in other words, the mirror reflective element may be formed so that the driver may view, at the interior rearview mirror assembly, the side lane area at the driver side of the vehicle more than the side lane area at the passenger side of the vehicle, or vice versa).

Thus, and as discussed above, conventional aspheric outside mirror elements are commonly used in the likes of European vehicles to enhance the field of view of the driver, particularly on the driver side of the equipped vehicle. The aspheric mirror element accomplishes this by providing an ever decreasing radius (decreasing magnification) wide-viewing mirror region outboard of a typically convex main viewing portion of the mirror element. While the overall field of view of the aspheric mirror element is appreciably increased by use of the highly bent outboard wide-viewing portion, spatial distortion and deterioration of distance perception occurs at a rate that increases across the outboard highly bent portion of the mirror element due to the ever decreasing radius of curvature as the outermost outboard edge of the mirror element is approached (with concomitant decrease in magnification). Due to this spatial distortion/decrease in magnification, a conventional aspheric mirror effectively provides awareness of presence of objects in the extended field of view but typically does not provide guidance as to the objects' proximity to/distance from the equipped vehicle. As a result, drivers must frequently turn theft heads away from the forward view in order to ascertain the position of objects and the relative ability to maneuver around them. In sharp contrast, the improved mirror elements of the present invention correct at least partially, and preferably correct substantially, the rectilinear distortion of the aspheric mirror element while maintaining a substantially similar field of view in the horizontal axis as that of a similarly sized/shaped aspheric mirror element it replaces on the driver side of a subject vehicle while, preferably, also maintaining the vertical field of view commonly found on a convex or a flat mirror driver side mirror element of similar size/shape/dimension. The combination of these aspects allows a driver to achieve a wider field of view and have a better perception of spatial relationships as the views as seen by the driver using the improved mirror elements of the present invention are no longer as distorted.

Additionally, maintenance of the vertical field of view to be similar to a convex or a flat mirror allows the driver to maintain a consistent angle of observation for objects in the vertical axis. This assists providing a consistent sense of distance for objects behind the vehicle. Thus, by using the field of view delivered by a conventional aspheric driver side mirror as a target, and by utilizing that aspheric field of view as the target object plane when designing likes of a free-form driver side glass mirror element as described above, the field of view of the being-replaced aspheric mirror element on a subject vehicle can be delivered, but with substantially reduced distortion, by a free from mirror element as described above. Alternately, a smaller free-form shape/size/dimension mirror element may be used as a replacement for a driver side aspheric mirror element or a same-sized free-form mirror element can replace the aspheric mirror element but delivering, with reduced distortion, a wider field of view into the side blind zone area by selectively extending the field of view in the horizontal axis while largely sustaining the field of view in the vertical axis.

Optionally, the reflective element may attach to a mounting surface of or at the mirror head portion or the reflective element may be received in or partially received in a receiving structure or bezel structure at the mirror head portion (and may be attached at a mounting plate or backing plate that may be adjustably mounted or disposed in the mirror casing and that may be adjustable via a powered mirror reflective element adjustment actuator to allow for adjustment of the mirror reflective element relative to the mirror casing to establish a desired rearward field of view to the driver of the vehicle), while remaining within the spirit and scope of the present invention. Reflective element 12 may comprise a single pane reflective element or an electro-optic reflective element (such as an electrochromic reflective element) with front and rear substrates and an electro-optic medium sandwiched therebetween, such as discussed below. Optionally, the reflective element may have a fillet or rounded edge or radius established around its perimeter edge, such as to meet safety regulations is exposed, and may not include a bezel portion that encompasses the perimeter edge of the reflective element when the reflective element is attached to the mirror head portion 14 (such as described in U.S. patent application Ser. No. 13/023,747, filed Feb. 9, 2011 (Attorney Docket DON09 P-1676), which is hereby incorporated herein by reference in its entirety). The reflective element 12 is adjustably mounted or supported at or in or partially in mirror head portion 14, such as via a reflective element actuator or the like.

Optionally, the reflective element may comprise a glass substrate coated with a bendable reflector coating (such as of silicon as described in U.S. Pat. Nos. 6,065,840; 5,959,792; 5,535,056 and 5,751,489, which are hereby incorporated by reference herein in their entireties).

Optionally, the reflective element may include a metallic perimeter band disposed around the perimeter of the reflective element n, such as by utilizing aspects of the reflective elements described in U.S. Pat. Nos. 7,626,749; 7,274,501; 7,184,190; and/or 7,255,451, and/or U.S. patent application Ser. No. 11/226,628, filed Sep. 14, 2005 and published Mar. 23, 2006 as U.S. Publication No. US-2006-0061008, which is hereby incorporated herein by reference in their entireties.

Optionally, the mirror head portion or mirror casing or a back plate may include a perimeter framing portion or bezel portion that extends around the perimeter edges of the reflective element to support the reflective element and frame the reflective element at the mirror assembly (such as by utilizing aspects of the mirror assemblies described in U.S. Pat. No. 7,581,859, which is hereby incorporated herein by reference in its entirety). The perimeter bezel portion may be narrow or small depending on the particular application of the reflective element and mirror reflector sub-assembly. Optionally, the mirror reflective element may comprise a bezelless or frameless reflective element (such as the types described in U.S. Pat. Nos. 7,626,749; 7,184,190 and/or 7,255,451; and/or U.S. patent application Ser. No. 11/226,628, filed Sep. 14, 2005 and published Mar. 23, 2006 as U.S. Publication No. US-2006-0061008, which are hereby incorporated herein by reference in their entireties), whereby the back plate may not include a perimeter framing portion or bezel portion around the perimeter of the reflective element. The reflective element assembly may utilize aspects of the mirror assemblies shown and/or described in U.S. Des. Pat. Nos. D633,423; D633,019; D638,761; and/or D647,017, and/or PCT Application No. PCT/US2013/027346, filed Feb. 22, 2013 and published Aug. 9, 2013 as International Publication No. WO 2013/126719, and/or PCT Application No. PCT/US2012/064398, filed Nov. 9, 2012 and published May 16, 2013 as International Publication No. WO 2013/071070, and/or PCT Application No. PCT/US2011/056295, filed Oct. 14, 2011 and published Apr. 19, 2012 as International Publication No. WO 2012/051500, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. Pat. Nos. 7,253,723 and/or 8,154,418, which are all hereby incorporated herein by reference in their entireties.

Optionally, the mirror assembly and/or reflective element may include a wide angle reflector or blind spot viewing aid or the like to provide a wide angle field of view of the blind spot area at the side of the vehicle to the driver of the vehicle. The mirror reflective element may include a first or principal mirror reflective element portion and a second or auxiliary wide angle reflective element portion or reflective optic. The auxiliary wide angle portion or optic may be integrally formed with the mirror reflective element 12, such as by utilizing aspects of the mirror assemblies described in U.S. Pat. Nos. 8,021,005; 7,934,844; 7,887,204; 7,824,045; and 7,748,856, which are hereby incorporated herein by reference in their entireties, or the auxiliary wide angle portion or optic may comprise a separate element or optic, such as by utilizing aspects of the mirror assemblies described in U.S. Pat. Nos. 7,255,451; 7,195,381; 6,717,712; 7,126,456; 6,315,419; 7,097,312; 6,522,451; 6,315,419; 5,080,492; 5,050,977; and/or 5,033,835, which are hereby incorporated herein by reference in their entireties.

Optionally, the exterior mirror assembly may include a heater element or pad at the rear of the reflective element and operable to heat the reflective element. The heater pad may comprise a mirror defrost/demisting heater such as a heater pad or a heater film or a heater element, and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. patent application Ser. No. 11/779,047, filed Jul. 17, 2007, and published Jan. 17, 2008 as U.S. Pat. Publication No. 20080011733; and/or Ser. No. 13/111,407, filed May 19, 2011, which are hereby incorporated herein by reference in their entireties. The heater element may include electrical contacts that extend rearward therefrom and through an aperture or apertures of the attaching portion of the back plate for electrical connection to a wire harness or connector of the mirror assembly, or the back plate and/or heater pad may include suitable electrical connectors and connections incorporated therein (such as by utilizing aspects of the mirror assembly described in U.S. Pat. No. 7,400,435, which is hereby incorporated herein by reference in its entirety) for electrically connecting the heater pad (or other suitable electrical connectors may be utilized, such as electrical leads or wire harnesses or pigtails or other separate connectors or cables or the like).

The mirror assembly may comprise a powerfold assembly where the mirror head is adjusted or pivoted relative to the vehicle via an actuator disposed at the mirror mounting portion and/or mirror head. Examples of adjustable or powerfold rearview mirror assemblies and actuators are described in U.S. Pat. Nos. 7,314,285; 7,267,449; 7,159,992; 7,093,946; 6,312,135; 6,243,218; and 5,703,731, which are hereby incorporated herein by reference in their entireties. The actuator assembly or device and its motors and gears may comprise any suitable rotational driving device or means, such as rotational driving devices similar to those used in power fold mirror applications (such as the types described in U.S. Pat. Nos. 7,314,285; 7,267,449; 7,159,992; 7,093,946; 6,312,135; 6,243,218; and 5,703,731, which are hereby incorporated herein by reference in their entireties, and may utilize aspects of the indexing and control pivoting of the mirrors described in U.S. Pat. No. 5,703,731) or the like, or may such as pivotal or rotational driving devices or actuators similar to those used in reflective element actuators (such as the types described in U.S. Pat. Nos. 7,722,199; 7,080,914; 7,073,914; 7,104,663; 6,916,100; 6,755,544; 6,698,905; 6,685,864; 6,467,920; 6,362,548; 6,243,218; 6,229,226; 6,213,612; 5,986,364 and 5,900,999, and/or U.S. patent application Ser. No. 11/504,353, filed Aug. 15, 2006 and published Jan. 4, 2007 as U.S. Publication No. 2007/002477, which are hereby incorporated herein by reference in their entireties). Optionally, the mirror assembly may comprise a dual actuator device, such as by utilizing aspects of the mirror assemblies described in PCT Application No. PCT/US2013/027346, filed Feb. 22, 2013 and published Aug. 29, 2013 as International Publication No. WO 2013/126719, and/or PCT Application No. PCT/US2012/064398, filed Nov. 9, 2012 and published May 16, 2013 as International Publication No. WO 2013/071070, and/or U.S. patent application Ser. No. 13/663,542, filed Oct. 30, 2012, which are hereby incorporated herein by reference in their entireties.

Optionally, the rearview mirror reflective element assembly of the present invention comprises an electro-optic or electrochromic reflective element assembly or cell, such as an electrochromic mirror reflective element assembly with coated substrates that are coated utilizing principles disclosed in commonly assigned U.S. Pat. Nos. 7,310,178; 7,274,501; 7,255,451; 7,195,381; 7,184,190; 6,690,268; 5,140,455; 5,151,816; 6,420,036; 6,245,262; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly that receives or incorporates the mirror reflective element assembly or cell constructed in accordance with the present invention.

Optionally, the mirror assembly may include an indicator or illumination source (such as for backlighting an indicator or indicia at the reflective element), such as by utilizing aspects of the mirror assemblies described in U.S. Pat. Nos. 8,058,977; 7,855,755; 7,492,281; 6,919,796; 6,198,409; 5,929,786; and 5,786,772, which are hereby incorporated herein by reference in their entireties. Optionally, other illumination sources may be included, such as for illuminating a side region at or adjacent to the vehicle or illuminating other regions exterior of the vehicle, such as by utilizing aspects of the mirror assemblies described in U.S. Pat. Nos. 8,333,492; 6,669,267; 6,969,101; 6,824,281; and/or 7,188,963, and/or U.S. patent application Ser. No. 13/249,433, filed Sep. 30, 2011, now U.S. Pat. No. 8,764,256, which are hereby incorporated herein by reference in their entireties.

Optionally, the mirror assembly may include a blind spot indicator and/or a turn signal indicator, such as an indicator or indicators of the types described in U.S. Pat. Nos. 8,058,977; 7,944,371; 7,492,281; 6,198,409; 5,929,786; and 5,786,772, which are hereby incorporated herein by reference in their entireties. The signal indicator or indication module may include or utilize aspects of various light modules or systems or devices, such as the types described in U.S. Pat. Nos. 8,058,977; 7,626,749; 7,581,859; 7,255,451; 6,227,689; 6,582,109; 5,371,659; 5,497,306; 5,669,699; 5,823,654; 6,176,602; and/or 6,276,821; and/or U.S. patent application Ser. No. 12/187,725, filed Aug. 7, 2008, now U.S. Pat. No. 8,786,704, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,720,580; 7,492,281; 7,038,577; 6,882,287; 6,198,409; 5,929,786; and 5,786,772, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,881,496; 7,720,580; 7,038,577; 6,882,287; 6,198,409; 5,929,786; and/or 5,786,772, and/or U.S. patent applications, and/or U.S. provisional application Ser. No. 60/618,686, filed Oct. 14, 2004 by Laubinger, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 7,005,974; and/or 6,757,109, and/or of the automatic headlamp controls described in U.S. Pat. Nos. 7,526,103; 5,796,094 and/or 5,715,093, and/or of the rain sensors described in U.S. Pat. Nos. 6,250,148 and 6,341,523, and/or of other imaging systems, such as the types described in U.S. Pat. Nos. 6,353,392 and 6,313,454, and/or PCT Application No. PCT/US2010/25545, filed Feb. 16, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, which may utilize various imaging sensors or imaging array sensors or cameras or the like, such as a CMOS imaging array sensor, a CCD sensor or other sensors or the like, such as the types disclosed in commonly assigned, U.S. Pat. Nos. 7,339,149; 5,550,677; 5,760,962; 6,097,023 and 5,796,094, and/or PCT Application No. PCT/US2003/036177 filed Nov. 14, 2003, published Jun. 3, 2004 as PCT Publication No. WO 2004/047421, with all of the above referenced U.S. patents, patent applications and provisional applications and PCT applications being commonly assigned and being hereby incorporated herein by reference in their entireties.

The signal indicator or indication module of the exterior rearview mirror assembly may include or utilize aspects of various light modules or systems or devices, such as the types described in U.S. Pat. Nos. 7,581,859; 7,289,037; 6,227,689; 6,582,109; 5,371,659; 5,497,306; 5,669,699; 5,823,654; 6,176,602; and/or 6,276,821, and/or U.S. patent application Ser. No. 11/226,628, filed Sep. 14, 2005 and published Mar. 23, 2006 as U.S. Publication No. US-2006-0061008, and/or PCT Application No. PCT/US2006/018567, filed May 16, 2006 and published Nov. 23, 2006 as International Publication No. WO 2006/124682, which are hereby incorporated herein by reference in their entireties. Optionally, the illumination module may also comprise a ground illumination light or puddle lamp, which provides downwardly directed illumination (and which may provide a back lit icon or indicia or logo or the like), such as by utilizing aspects of the illumination systems described in U.S. Pat. Nos. 8,333,492; 5,371,659, 5,669,699, 5,823,654 and 5,497,305, which are hereby incorporated herein by reference in their entireties. Optionally, the illumination module or device of the exterior rearview mirror assembly may comprise a cornering light and a puddle lamp and turn signal light, and may have a wrap-around style turn signal at the exterior mirror that may be fitted with a prism lens or the like to project light in the appropriate direction and/or toward the targeted location. The illumination module thus may include one or more illumination sources and one or more lenses or optics or light pipes or the like to distribute or direct illumination toward the appropriate targeted areas.

Optionally, the exterior rearview mirror assembly may include a camera or imaging sensor that may be part of a multi-camera system, such as an object detection system or a surround view or "bird's eye view" display system or a Japan View™ vision system or the like (now common in exterior mirrors used in Japan where a video camera is located in the exterior mirror assembly at the side of a vehicle and viewing generally downwardly to allow the driver of the vehicle to view on an interior-cabin mounted video screen whether the likes of a child might be present in the blindzone to the side of the vehicle), such as by utilizing aspects of the vision systems described in PCT Application No. PCT/CA2012/00378, filed Apr. 25, 2012 and published Nov. 1, 2012 as International Publication No. WO 2012/145822, and/or PCT Application No. PCT/US10/25545, filed Feb. 26, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or U.S. patent application Ser. No. 13/333,337, filed Dec. 21, 2011, which are all hereby incorporated herein by reference in their entireties).

Optionally, the mirror assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 7,370,983; 7,274,501; 7,255,451; 7,184,190; 7,195,381; 6,690,268; 5,668,663 and/or 5,724,187, and/or in U.S. patent application Ser. No. 10/538,724, filed Jun. 13, 2005 and published Mar. 9, 2006 as U.S. Publication No. US-2006-0050018, which are all hereby incorporated herein by reference in their entireties, or may include or incorporate video displays or the like, such as the types described in U.S. Pat. Nos. 7,855,755; 7,777,611; 7,370,983; and/or 6,690,268, which are hereby incorporated herein by reference in their entireties.

Optionally, user inputs may be provided in the vehicle for actuating and/or controlling various accessories and/or systems of the vehicle, such as accessories of an interior rearview mirror assembly or system of the vehicle. Optionally, such user inputs may be vision-based inputs, where motions by the driver of the vehicle are detected by a camera or image sensor of the vehicle. Such a camera or image sensor may be augmented (or replaced by) other sensor types, such as infrared (IR) sensors, pyro sensors, ultrasonic sensors, time of flight (TOF) sensors, field-effect sensors and/or the like. Gesture sensing using a camera is described such as in U.S. Publication No. US 2011/0043633, published Feb. 24, 2011, which is hereby incorporated herein by reference in its entirety, and non-vision-based sensing, such as using infrared and/or ultrasonic sensing is described such as in U.S. Pat. No. 8,091,280, which is hereby incorporated herein by reference in its entirety. For example, a gesture sensing device or sensor or system may be disposed in the vehicle (such as in the interior rearview mirror assembly of the vehicle or in or at the front instrument panel of the vehicle) and may be operable to detect hand motions or signals or gestures made by the driver of the vehicle and/or head motions made by the driver of the vehicle and/or eye movement or facial gestures or mouth or lip movements made by the driver of the vehicle, whereby a control may discern such gestures and/or movements and may control an accessory or system of the vehicle according to the discerned gesture or movement. Such accessory or system may include an information or infotainment system of the vehicle, a navigational system of the vehicle, a telematic or remote communication system of the vehicle, such as a cellular phone system of the vehicle, a mechanical system of the vehicle, such as a window opening or closing mechanism, a safety system of the vehicle, a lighting system of the vehicle (such as a left turn signal or right turn signal actuation), and/or the like. Such a gesture-based user input system may augment, reduce or obviate the need for mechanical or electrical buttons or switches or the like in the vehicle cabin. For example, the system may utilize aspects of the user input systems described in PCT Application No. PCT/US2013/022119, filed Jan. 18, 2013, and/or U.S. provisional applications, Ser. No. 61/837,955, filed Jun. 21, 2013; Ser. No. 61/844,630, filed Jul. 10, 2013; Ser. No. 61/844,173, filed Jul. 9, 2013; and/or Ser. No. 61/844,171, filed Jul. 9, 2013, which are hereby incorporated herein by reference in their entireties. Thus, vehicle accessory control may be adapted to be responsive to hand gestures and/or head gestures or movements or the like.

Thus, for example, by camera recognized motions of the hands and/or eyes and/or head and/or mouth and/or the like of the driver or occupant of the vehicle, in combination with menus and/or other inputs, switches and buttons and the like in the vehicle can be reduced or eliminated. Such a camera (or other sensor or detector operable to detect motions) may be mounted at or in the interior rear view mirror assembly, such as with a display or projected display or the like, which may display the menus and/or indications of the selected inputs or the like. Optionally, the camera for gesture sensing (or other gesture sensing device) may be attached at the mirror head so that the camera moves in tandem with the mirror head when the mirror head is adjusted to provide the driver with the desired or appropriate rearward field of view, and so that the camera may be set or positioned to capture images of the driver of the vehicle when the mirror head is adjusted by the driver of the vehicle to set the rearward field of view of the driver of the vehicle. Optionally, the sensor may be in the mirror head itself and may view through the mirror reflector, such as by utilizing aspects of the mirror systems described in U.S. Pat. No. 8,098,142, which is hereby incorporated herein by reference in its entirety, or the sensor may be mounted at a bezel portion of the mirror assembly and may move with it when the mirror head is adjusted by the driver of the vehicle to set the rearward field of view of the driver of the vehicle. Optionally, the camera or gesture sensing device may be disposed at a fixed portion of the interior rearview mirror assembly or may be disposed elsewhere in the vehicle cabin.

Changes and modifications to the specifically described embodiments may be carried out without departing from the principles of the present invention, which is intended to be limited only by the scope of the appended claims as interpreted according to the principles of patent law.

The invention claimed is:

1. An exterior rearview mirror assembly for a vehicle, said exterior rearview mirror assembly comprising:
 a mirror head portion;
 a reflective element accommodated by said mirror head portion, said reflective element comprising a glass substrate and a mirror reflector coated at a surface of said glass substrate;
 wherein said reflective element is configured to provide a field of view of at least about 15 degrees at the side of a vehicle equipped with said exterior rearview mirror assembly and wherein said reflective element provides a substantially undistorted reflected image as viewed by a driver of the equipped vehicle;
 wherein said reflective element has a width dimension of less than about 15 cm and a height dimension of less than about 9 cm; and
 wherein said glass substrate is formed via a hydro-bending process utilizing at least one bending element having a free form curvature so that said surface of said glass substrate of said reflective element has a free form curvature that corresponds to the free form curvature of said at least one bending element.

2. The exterior rearview mirror assembly of claim 1, wherein said at least one bending element is CNC formed in accordance with a free form pattern of curvatures.

3. The exterior rearview mirror assembly of claim 1, wherein said reflective element comprises a non-electro-optic reflective element and wherein said glass substrate of said non-electro-optic reflective element comprises a single glass substrate having said mirror reflector coated at a rear surface thereof.

4. The exterior rearview mirror assembly of claim 1, wherein said reflective element comprises an electrochromic mirror reflective element having a front glass substrate and a rear glass substrate and an electrochromic medium disposed between said front and rear glass substrates, and wherein both said front and rear glass substrates are formed to match via said hydro-bending process.

5. The exterior rearview mirror assembly of claim 1, wherein said hydro-bending process utilizes a mold and a hydro-bladder.

6. The exterior rearview mirror assembly of claim 1, wherein said reflective element has a reduced size that is at least about 25 percent smaller than that of a conventional planar reflective element.

7. The exterior rearview mirror assembly of claim 1, wherein coordinates of the view point of the driver of the equipped vehicle and of the image plane and of the object plane are determined by the mirror size and vehicle design, and wherein said mirror substrate is formed based on the determined coordinates.

8. The exterior rearview mirror assembly of claim 7, wherein the determined coordinates comprise coordinates of a view point of a driver of the equipped vehicle and wherein the determined image plane comprises an image plane that will provide a desired angled field of view to the driver viewing from the determined view point, and wherein the determined object plane represents the field of view of the driver at a location rearward of the equipped vehicle.

9. The exterior rearview mirror assembly of claim 1, wherein said mirror head portion is mountable at a driver side of the equipped vehicle.

10. The exterior rearview mirror assembly of claim 1, wherein said mirror head portion is mountable at a passenger side of the equipped vehicle.

11. An exterior rearview mirror assembly for a vehicle, said exterior rearview mirror assembly comprising:
  a mirror head portion;
  a reflective element accommodated by said mirror head portion;
  wherein said reflective element comprises a non-electro-optic reflective element having a single glass substrate having a mirror reflector coated at a rear surface thereof;
  wherein said reflective element is configured to provide a field of view of at least about 15 degrees at the side of a vehicle equipped with said exterior rearview mirror assembly and wherein said reflective element provides a substantially undistorted reflected image as viewed by a driver of the equipped vehicle;
  wherein said reflective element has a width dimension of less than about 15 cm and a height dimension of less than about 9 cm; and
  wherein said glass substrate is formed via a hydro-bending process utilizing at least one bending element having a free form curvature so that said surface of said glass substrate of said reflective element has a free form curvature that corresponds to the free form curvature of said at least one bending element, and wherein said at least one bending element is CNC formed in accordance with a free form pattern of curvatures.

12. The exterior rearview mirror assembly of claim 11, wherein said hydro-bending process utilizes a mold and a hydro-bladder.

13. The exterior rearview mirror assembly of claim 11, wherein coordinates of the view point of the driver of the equipped vehicle and of the image plane and of the object plane are determined by the mirror size and vehicle design, and wherein said mirror substrate is formed based on the determined coordinates, and wherein the determined coordinates comprise coordinates of a view point of a driver of the equipped vehicle and wherein the determined image plane comprises an image plane that will provide a desired angled field of view to the driver viewing from the determined view point, and wherein the determined object plane represents the field of view of the driver at a location rearward of the equipped vehicle.

14. A method of providing a reflective element for an exterior rearview mirror assembly of a vehicle, said method comprising:
  determining coordinates of a view point of a driver of a vehicle that is to be equipped with the provided reflective element;
  determining an image plane that will provide a desired field of view to the driver viewing from the determined view point;
  determining an object plane that represents a desired field of view at a location rearward of the vehicle;
  providing at least one bending element having a free form curvature derived from the determined view point coordinates, the determined image plane and the determined object plane;
  providing a flat glass substrate;
  bending said glass substrate via said at least one bending element so that said surface of said glass substrate of said reflective element has a free form curvature that corresponds to the free form curvature of said at least one bending element; and
  coating a surface of said glass substrate with a mirror reflector.

15. The method of claim 14, wherein providing said at least one bending element comprises CNC forming said at least one bending element in accordance with a free form pattern of curvatures.

16. The method of claim 15, wherein providing at least one bending element comprises providing at least one bending element for a hydro-bending process, and wherein bending said glass substrate comprises bending said glass substrate via said hydro-bending process utilizing said at least one bending element.

17. The method of claim 16, wherein said hydro-bending process utilizes a mold and a hydro-bladder.

18. The method of claim 14, wherein one of (i) said glass substrate is for a non-electro-optic reflective element and (ii) said glass substrate comprises a rear glass substrate for an electrochromic mirror reflective element having a front glass substrate and an electrochromic medium disposed between said front and rear glass substrates, and wherein both said front and rear glass substrates are formed to match via said hydro-bending process.

19. The method of claim 14, wherein the coordinates of the view point of the driver and the image plane and the object plane are determined by the selected mirror size and vehicle application.

20. The method of claim 14, wherein determining an object plane comprises determining an object plane that defines a size and shape and border of the rearward field of view of the driver at a distance behind the determined image plane that is determined by where the rearward field of view intersects a ground plane at which the vehicle would be located.

* * * * *

UNITED STATES PATENT AND TRADEMARK OFFICE
CERTIFICATE OF CORRECTION

| | | |
|---|---|---|
| PATENT NO. | : 8,917,437 B2 | Page 1 of 1 |
| APPLICATION NO. | : 13/942751 | |
| DATED | : December 23, 2014 | |
| INVENTOR(S) | : Michael Baur and Gregory Huizen | |

It is certified that error appears in the above-identified patent and that said Letters Patent is hereby corrected as shown below:

Specification

Column 11
Line 41, "theft" should be --their--

Column 13
Line 7, "9" should be --29--
Line 17, "2011as" should be --2011 as--

Signed and Sealed this
Tenth Day of November, 2015

Michelle K. Lee
*Director of the United States Patent and Trademark Office*